US012500822B2

(12) United States Patent
Gorshe et al.

(10) Patent No.: US 12,500,822 B2
(45) Date of Patent: Dec. 16, 2025

(54) SYSTEM AND METHOD FOR RATE ADAPTATION OF PACKET-ORIENTED CLIENT DATA FOR TRANSMISSION OVER A METRO TRANSPORT NETWORK (MTN)

(71) Applicant: Microchip Technology Inc., Chandler, AZ (US)

(72) Inventors: Steven Scott Gorshe, Beaverton, OR (US); Winston Mok, Vancouver (CA)

(73) Assignee: Microchip Technology Inc., Chandler, AZ (US)

(*) Notice: Subject to any disclaimer, the term of this patent is extended or adjusted under 35 U.S.C. 154(b) by 419 days.

(21) Appl. No.: 18/116,293

(22) Filed: Mar. 1, 2023

(65) Prior Publication Data

US 2023/0318934 A1   Oct. 5, 2023

Related U.S. Application Data

(60) Provisional application No. 63/326,989, filed on Apr. 4, 2022.

(51) Int. Cl.
  *H04L 41/34* (2022.01)
  *H04L 45/00* (2022.01)
  *H04L 69/22* (2022.01)
(52) U.S. Cl.
  CPC .............. *H04L 41/34* (2022.05); *H04L 45/34* (2013.01); *H04L 69/22* (2013.01)
(58) Field of Classification Search
  CPC .... H04J 3/1658; H04J 3/07; H04J 2203/0085; H04J 2203/0073; H04L 47/25;
  (Continued)

(56) References Cited

U.S. PATENT DOCUMENTS 5,343,482 A   8/1994   Penner et al.
5,361,277 A   11/1994   Grover
   (Continued)

FOREIGN PATENT DOCUMENTS

EP   1145477 A1   10/2001
EP   3544210 A1   9/2019
   (Continued)

OTHER PUBLICATIONS

U.S. Appl. No. 18/202,899, filed May 27, 2023, Scott Muma.
   (Continued)

*Primary Examiner* — Mahran Y Abu Roumi
(74) *Attorney, Agent, or Firm* — Glass & Associates; Molly Sauter; Kenneth Glass

(57) ABSTRACT

A system and method for performing rate adaptation of sub1G packet-oriented client signals for transmission over a Metro Transport Network (MTN) by forming a 64B/66B-encoded client signal from individual client packets of the sub1G packet-oriented client signal and the idle blocks within an inter-packet gap (IPG), inserting thread operations, administration and maintenance (ThOAM) overhead to generate a 64B/66B-encoded client thread signal, performing an idle mapping procedure (IMP) to generate a rate adapted 64B/66B-encoded client thread signal, defining a plurality of pseudo-Ethernet packets in an MTN path, defining a thread channel within the plurality of pseudo-Ethernet packets and mapping the rate adapted 64B/66B-encoded client thread signal into the defined thread channel within the plurality of pseudo-Ethernet packets to generate an MTN path signal for transmission to an intermediate node or a sink mode.

21 Claims, 8 Drawing Sheets

(58) Field of Classification Search
CPC ........ G06F 21/84; G06F 3/1454; G06F 21/62; G06Q 30/016
See application file for complete search history.

(56) References Cited

U.S. PATENT DOCUMENTS

| | | | |
|---|---|---|---|
| 5,371,765 A | 12/1994 | Guilford |
| 5,600,824 A | 2/1997 | Williams et al. |
| 5,640,398 A | 6/1997 | Carr et al. |
| 5,838,512 A | 11/1998 | Okazaki |
| 5,850,422 A | 12/1998 | Chen |
| 5,905,766 A | 5/1999 | Nguyen |
| 6,044,122 A | 3/2000 | Ellersick et al. |
| 6,052,073 A | 4/2000 | Carr et al. |
| 6,138,061 A | 10/2000 | McEnnan et al. |
| 6,150,965 A | 11/2000 | Carr et al. |
| 6,188,699 B1 | 2/2001 | Lang et al. |
| 6,333,935 B1 | 12/2001 | Carr et al. |
| 6,345,052 B1 | 2/2002 | Tse et al. |
| 6,359,479 B1 | 3/2002 | Oprescu |
| 6,501,340 B1 | 12/2002 | Flood |
| 6,584,521 B1 | 6/2003 | Dillabough et al. |
| 6,603,776 B1 | 8/2003 | Fedders et al. |
| 6,668,297 B1 | 12/2003 | Karr et al. |
| 6,671,758 B1 | 12/2003 | Cam et al. |
| 6,744,787 B1 | 6/2004 | Schatz et al. |
| 6,820,159 B2 | 11/2004 | Mok et al. |
| 6,823,001 B1 | 11/2004 | Chea |
| 6,829,717 B1 | 12/2004 | Roust |
| 6,870,831 B2 | 3/2005 | Hughes et al. |
| 7,117,112 B2 | 10/2006 | Mok |
| 7,161,999 B2 | 1/2007 | Parikh |
| 7,165,003 B2 | 1/2007 | Mok |
| 7,187,741 B2 | 3/2007 | Pontius et al. |
| 7,203,616 B2 | 4/2007 | Mok |
| 7,239,650 B2 | 7/2007 | Rakib et al. |
| 7,239,669 B2 | 7/2007 | Cummings et al. |
| 7,295,945 B2 | 11/2007 | Mok |
| 7,388,160 B2 | 6/2008 | Mok et al. |
| 7,417,985 B1 | 8/2008 | McCrosky et al. |
| 7,468,974 B1 | 12/2008 | Carr et al. |
| 7,492,760 B1 | 2/2009 | Plante et al. |
| 7,593,411 B2 | 9/2009 | McCrosky et al. |
| 7,656,791 B1 | 2/2010 | Mok et al. |
| 7,668,210 B1 | 2/2010 | Mok et al. |
| 7,751,411 B2 | 7/2010 | Cam et al. |
| 7,772,898 B2 | 8/2010 | Cheung |
| 7,807,933 B2 | 10/2010 | Mok et al. |
| 7,817,673 B2 | 10/2010 | Scott et al. |
| 8,010,355 B2 | 8/2011 | Rahbar |
| 8,023,641 B2 | 9/2011 | Rahbar |
| 8,068,559 B1 | 11/2011 | Butcher |
| 8,085,764 B1 | 12/2011 | McCrosky et al. |
| 8,139,704 B2 | 3/2012 | Heinrich |
| 8,243,759 B2 | 8/2012 | Rahbar |
| 8,335,319 B2 | 12/2012 | Rahbar |
| 8,413,006 B1 | 4/2013 | Mok et al. |
| 8,428,203 B1 | 4/2013 | Zortea et al. |
| 8,483,244 B2 | 7/2013 | Rahbar |
| 8,542,708 B1 | 9/2013 | Mok et al. |
| 8,599,986 B2 | 12/2013 | Rahbar |
| 8,774,227 B2 | 7/2014 | Rahbar |
| 8,854,963 B1 | 10/2014 | Muma et al. |
| 8,913,688 B1 | 12/2014 | Jenkins |
| 8,957,711 B2 | 2/2015 | Jin et al. |
| 8,971,548 B2 | 3/2015 | Rahbar et al. |
| 8,976,816 B1 | 3/2015 | Mok et al. |
| 8,982,910 B1 | 3/2015 | Zhang et al. |
| 8,989,222 B1 | 3/2015 | Mok et al. |
| 9,019,997 B1 | 4/2015 | Mok et al. |
| 9,025,594 B1 | 5/2015 | Mok et al. |
| 9,209,965 B2 | 12/2015 | Rahbar et al. |
| 9,276,874 B1 | 3/2016 | Mok et al. |
| 9,313,563 B1 | 4/2016 | Mok et al. |
| 9,337,960 B2 | 5/2016 | Zhong |
| 9,374,265 B1 | 6/2016 | Mok et al. |
| 9,444,474 B2 | 9/2016 | Rahbar et al. |
| 9,473,261 B1 | 10/2016 | Tse et al. |
| 9,503,254 B2 | 11/2016 | Rahbar et al. |
| 9,525,482 B1 | 12/2016 | Tse |
| 10,069,503 B2 | 9/2018 | Zhang et al. |
| 10,079,651 B2 | 9/2018 | Ramachandra |
| 10,104,047 B2 | 10/2018 | Muma et al. |
| 10,128,826 B2 | 11/2018 | Jin et al. |
| 10,218,823 B2 | 2/2019 | Gareau |
| 10,250,379 B2 | 4/2019 | Haddad et al. |
| 10,397,088 B2 | 8/2019 | Gareau |
| 10,432,553 B2 | 10/2019 | Tse |
| 10,594,329 B1 | 3/2020 | Elkholy |
| 10,594,423 B1 | 3/2020 | Anand et al. |
| 10,608,647 B1 | 3/2020 | Ranganathan et al. |
| 10,715,307 B1 | 7/2020 | Jin |
| 10,797,816 B1 | 10/2020 | Gorshe et al. |
| 10,917,097 B1 | 2/2021 | Meyer et al. |
| 11,108,895 B2 | 8/2021 | Mok et al. |
| 11,128,742 B2 | 9/2021 | Gorshe et al. |
| 11,239,933 B2 | 2/2022 | Mok et al. |
| 2001/0056512 A1 | 12/2001 | Mok et al. |
| 2002/0158700 A1 | 10/2002 | Nemoto |
| 2004/0082982 A1 | 4/2004 | Gord et al. |
| 2005/0110524 A1 | 5/2005 | Glasser |
| 2005/0182848 A1 | 8/2005 | Mcneil et al. |
| 2006/0056560 A1 | 3/2006 | Aweya et al. |
| 2006/0064716 A1 | 3/2006 | Sull et al. |
| 2006/0076988 A1 | 4/2006 | Kessels et al. |
| 2007/0036173 A1 | 2/2007 | McCrosky et al. |
| 2007/0064834 A1 | 3/2007 | Yoshizawa |
| 2007/0132259 A1 | 6/2007 | Ivannikov et al. |
| 2008/0000176 A1 | 1/2008 | Mandelzys et al. |
| 2008/0202805 A1 | 8/2008 | Mok et al. |
| 2010/0052797 A1 | 3/2010 | Carley et al. |
| 2010/0150271 A1 | 6/2010 | Brown et al. |
| 2011/0095830 A1 | 4/2011 | Tsangaropoulos et al. |
| 2012/0158990 A1 | 6/2012 | Losio et al. |
| 2013/0101292 A1 | 4/2013 | Lanzone et al. |
| 2014/0055179 A1 | 2/2014 | Gong et al. |
| 2014/0139275 A1 | 5/2014 | Dally et al. |
| 2014/0149821 A1 | 5/2014 | Zhou et al. |
| 2015/0078406 A1 | 3/2015 | Caggioni et al. |
| 2015/0117177 A1 | 4/2015 | Ganga et al. |
| 2015/0278534 A1* | 10/2015 | Thiyagarajan .......... G06F 21/84 |
| | | 726/28 |
| 2015/0288538 A1 | 10/2015 | Fritschi et al. |
| 2016/0020872 A1 | 1/2016 | Zhong |
| 2016/0127072 A1 | 5/2016 | Chen et al. |
| 2016/0277030 A1 | 9/2016 | Burbano et al. |
| 2016/0301669 A1 | 10/2016 | Muma et al. |
| 2016/0315634 A1 | 10/2016 | Mei et al. |
| 2016/0330014 A1 | 11/2016 | Jain |
| 2017/0005949 A1 | 1/2017 | Gareau |
| 2017/0171163 A1 | 6/2017 | Gareau et al. |
| 2017/0244648 A1 | 8/2017 | Tse |
| 2018/0131378 A1 | 5/2018 | Haroun et al. |
| 2018/0145928 A1 | 5/2018 | Zhong et al. |
| 2018/0159541 A1 | 6/2018 | Spijker |
| 2018/0159785 A1 | 6/2018 | Wu et al. |
| 2018/0183708 A1 | 6/2018 | Farkas et al. |
| 2019/0097758 A1 | 3/2019 | Huang et al. |
| 2019/0173856 A1 | 6/2019 | Gareau et al. |
| 2019/0394309 A1 | 12/2019 | Caldwell et al. |
| 2020/0018794 A1 | 1/2020 | Jehara |
| 2020/0067827 A1 | 2/2020 | Mei et al. |
| 2020/0166912 A1 | 5/2020 | Schneider et al. |
| 2020/0287998 A1 | 9/2020 | Gorshe et al. |
| 2020/0295874 A1 | 9/2020 | Cheng et al. |
| 2020/0296486 A1 | 9/2020 | Xiang et al. |
| 2020/0396097 A1 | 12/2020 | Deng et al. |
| 2021/0385310 A1 | 12/2021 | Gorshe et al. |
| 2022/0407742 A1 | 12/2022 | Sergeev et al. |
| 2022/0416895 A1 | 12/2022 | Liu |
| 2023/0006752 A1* | 1/2023 | Gorshe .................. H04J 3/12 |
| 2023/0006753 A1* | 1/2023 | Gorshe .................. H04J 3/07 |

(56) References Cited

U.S. PATENT DOCUMENTS

2023/0006938 A1* 1/2023 Gorshe .............. H04J 3/1658
2023/0254389 A1 8/2023 Gorshe et al.

FOREIGN PATENT DOCUMENTS

| KR | 101028593 B1 | 4/2011 |
|----|--------------|--------|
| WO | 2003039061 A3 | 10/2003 |
| WO | 2020185247 A1 | 9/2020 |
| WO | 2021016696 A1 | 2/2021 |
| WO | 2021040762 A1 | 3/2021 |
| WO | 2021126309 A1 | 6/2021 |
| WO | 2021151187 | 8/2021 |

OTHER PUBLICATIONS

Yang, Jian, Betts, Malkcolm, Gu, Yuan, "SCL OAM solution", ITU-T WD11-65, International Telecommunication Union, Geneva, Switzerland, Jun. 2018.
"Interfaces for the metro transport network; g8312", ITU-T Draft; Study Period 2017-2020; Study Group 15;Series G8312, International Telecommunication Union, Geneva ; CH, vol. 11/15, Nov. 25, 2020 (Nov. 25, 2020), pp. 1-21, XP044302831, Retrieved from the Internet: URL:https://www.itu.int/ifa/t/2017/sg15/exchange/wp3/qll/G.8312/g8312-IcCommentResol utions-v3.docx [retrieved on Nov. 25, 2020] cited in the application, p. 4, paragraphs 7.1, 7.2—p. 5; figures 6-1, 7.1 p. 9, paragraph 8.3; figures 8-9 p. 19, col. 11.1.
"IEEE 802.3 IEEE Standard for Ethernet Clause 82", IEEE, 2012.
"ITU-T Recommendation G.709 Interfaces for the Optical Transport Networks", ITU-T G.709/Y.1331, International Telecommunication Union, Jun. 2016.
"MEF 8 Implementation Agreement for the Emulation of PDH Circuits over Metro Ethernet Networks", Metro Ethernet Forum, Oct. 2004.
BA34003 Datasheet (Integrated Device Technology, Inc) Jun. 17, 2019 (Jun. 17, 2019).
Abdo Ahmad et al: "Low-Power Circuit for Measuring and Compensating Phase Interpolator Non-Linearity", 2019 IEEE 10th Annual Information Technology, Electronics and Mobile Communication Conference (IEMCON), IEEE, Oct. 17, 2019 (Oct. 17, 2019), pp. 310-313.
Eyal Oren "MTN Section Layer frame and Path layer format considerations;", C152211 , ITU-T Draft; Study Period 2017-2020; Study Group 15; Seri es C1522, International Telecommunication Union, Geneva • CH, vol. 11/15 Jun. 18, 2019 (Jun. 18, 2019), pp. 1-4, XP044270354, Retrieved from the Internet: URL: https://www.itu.int/ifa/t/2017/sg15/do cs/c/ties/T17-SG15-C-1522!!MSW-E.docx [retrieved on Jun. 18, 2019] Section 2.
ITU-T Draft, "Interfaces for the metro transport network; g8312", Study period 2017-2020; Study Group 15; Series 8312, International Telecommunication Union, Geneva, Switzerland, Nov. 2020.
ITU-T G.8013/Y.1731, "Operation, administration and maintenance (OAM) functions and mechanisms for Ethernet-based networks", International Telecommunication Union, Geneva, Switzerland, Aug. 2015.
Maarten Vissers, "FlexE aware mapping method 6B text proposal; CD11-106", ITU-T Draft; Study Period 2013-2016, International Telecommunication Union, Geneva; CH, vol. 11/15, Jan. 12, 2016 (Jan. 12, 2016), pp. 1-3, Last paragraph of p. 2, p. 3, Figures 17-22.
Malcolm Johnson et al., "Optical Transport Networks from TDM to packet", ITU-T Manual 2010; ITU-T Draft; Study Period 2009-2012, International Telecommunication Union, Geneva, Switzerland, Feb. 22, 2011, pp. 91-122.
PCT/US2023/014355, International Search Report and Written Opinion, Mailed Jun. 6, 2023.
Qiwen Zhong et al: "Analysis for IPG based G.mtn path layer OAM insertion impact on IEEE 802.3 PCS state machine;C1195", ITU-T Draft; Study Period 2017-2020; Study Group 15; Series C1195, International Telecommunication Union, Geneva ; CH, vo l. 11/15 Jun. 18, 2019 (Jun. 18, 2019), pp. 1-6, XP044270155, Retrieved from the Internet: URL:https://www.itu.int/ifa/t/2017/sg15/do cs/c/ties/T17-SG15-C-1195!!MSW-E.docx [retrieved on Jun. 18, 2019] Section 2.2, 2.3.
Qiwen Zhong et al: "Discussion and proposal for G.mtn terminologies regarding Ethernet client signal ; WDII-39", ITU-T Draft; Study Period 2017-2020; Study Group 15; Series WDII-39, International Telecommunication Union, Geneva ; CH, vo l. 11/15 Apr. 1, 2019 (Apr. 1, 2019), pp. 1-10, XP044264678, Retrieved from the Internet: URL:https://www.itu.int/ifa/t/2017/sg15/ex change/wp3/qll/2019-04-Xian/WD11-39-Huawei-CMCC-Discussion and proposal for G.mtn terminologies. docx [retrieved on Apr. 1, 2019] Section 2.1; figure 2.
Steve Gorshe, "Analysis of the G.mtn A.1 Scope Relative to IEEE 802.3 Clause 82 State Diagrams; C1179", ITU- T Draft; Study Period 2017-2020; Study Group 15; Series C1179, International Telecommunication Union, Geneva ; CH, vo l. 11/15 Jun. 18, 2019 (Jun. 18, 2019), pp. 1-11, XP044270147, Retrieved from the Internet: URL:https://www.itu.int/ifa/t/2017/sg15/do cs/c/ties/T17-SG15-C-1179!!MSW-E.docx [retrieved on Jun. 18, 2019], figure 6.
Steve Gorshe, "MTN Path Overhead Proposal—Overhead Frame Structure; WD11-13", ITU-T Draft; Study Period 2017-2020; Study Group 15; Series C1181, International Telecommunication Union, Beneva; Switzerland, vol. 11/15 , Apr. 2, 2019.
Steve Gorshe, "MTN Path Overhead Proposal—Overhead Method and Frame Structure;CII81", ITU-T Draft; Study Period 2017-2020; Study Group 15; Series C1181, International Telecommunication Union, Geneva; Switzerland, vol. 11/15 , Jun. 18, 2019.
Steve Trowbridge Nokia USA: "Sample common sub-IG TDM multiplexing and switching mechanism for use over MTN and OTN networks;C2812", ITU-T Draft; Study Period 2021-2024; Study Group 15; Series C2812, International Telecommunication Union, Geneva ; CH vol. 11/15, Nov. 23, 2021 (Nov. 23, 2021), pp. 1-7, XP044322271, Retrieved from the Internet: URL:https://www-api.itu.int/ifa/t/2017/sgl 5/docs/c/ties/T17-SG15-C-2812! !MSW-E.docx [retrieved on Nov. 23, 2021].
Trowbridge, Steve, "G.mtn Section and Path Overhead Options," ITU-T WD11-10, International Telecommunication Union, Geneva, Switzerland, Apr. 2019.
Ximing Dong Cict PR China: "Feasibility Analysis: the Use of Idle as a Resources to Carry Path layer OAM; WDII-16", ITU-T Draft; Study Period 2017-2020; Study Group 15; Series WDII-16, International Telecommunication Union, Geneva ; Ch, vo l. 11/15, Apr. 1, 2019 (Apr. 1, 2019), pp. 1-6, XP044264659, Retrieved from the Internet: URL:https://www.itu.int/ifa/t/2017/sg15/ex change/wp3/qll/2019-04-Xian/WD11-16-CICT-CMC-FeasibilityAnalysis the Use of Idle Resources as OAM Carrier.docx [retrieved on Apr. 1, 2019].Section 2.1.
Zhang Sen et al, "Hybrid Multiplexing over FlexE Group," 2018 23rd Opto-Electronics and Communications Conference (OECC), IEEE, Jul. 2, 2018, pp. 1-2.

* cited by examiner

SYSTEM AND METHOD FOR RATE ADAPTATION OF PACKET-ORIENTED CLIENT DATA FOR TRANSMISSION OVER A METRO TRANSPORT NETWORK (MTN)

CROSS-REFERENCE TO RELATED APPLICATIONS

This application claims priority to U.S. Provisional Patent Application No. 63/326,989, filed Apr. 4, 2022, entitled "SYSTEM AND METHOD FOR PACKET CLIENT MAPPING/MULTIPLEXING INTO MTN SUB-1GBPS THREADS FOR TRANSMISSION OVER A METRO TRANSPORT NETWORK (MTN)", which is herein incorporated by reference in its entirety.

BACKGROUND OF THE INVENTION

An ITU-T G.8312 standard Metro Transport Network (MTN), published by the International Telecommunication Union, Geneva, Switzerland, is expected to carry both constant bit rate (CBR) client signals and sub-Gbit/s (sub1G) packet-oriented client signals over the MTN path. In this context, a sub1G packet-oriented client signal is one that can be carried over a channel within MTN that has a rate less than 1 Gbit/s (i.e., a sub 1G channel). Such a sub1G channel is referred to herein as a thread channel. Both sub1G CBR client signals and sub1G packet-oriented client signals require a method to insert the client signals into the payload region of the thread channels of the MTN and to rate adapt the client signals to the thread channel rate, and a method to add thread path OAM (Operations, Administrations, and Maintenance) Overhead to the client stream. For sub1G packet-oriented client signals, the rate at which the packets arrive at a source node of the MTN is variable. An idle mapping procedure (IMP), wherein idle blocks are inserted and/or removed within an inter-packet (IPG) region between Ethernet packets, may be used for rate adaptation of packet-oriented client signals. However, the reason why an IEEE 802.3 Clause 82 standard IMP approach is not directly applicable to sub1G packet-oriented client signals is that the sub1G packet-oriented client signals may utilize a line code other than 64B/66B-encoded blocks.

Accordingly, there is a need for an improved system and method that provides for rate adaptation of sub1G packet-oriented client signals for transportation over a Metro Transport Network (MTN).

SUMMARY OF THE INVENTION

The present examples provide a system and method for mapping, including rate adaptation, of sub1G Ethernet packet-oriented client data for transmission over a Metro Transport Network (MTN).

In one example, a method for performing rate adaptation of a sub1G packet-oriented client signal for transmission over an MTN path is provided which includes, receiving a sub1G packet-oriented client signal at a source node, wherein the sub1G packet-oriented client signal comprises a plurality of client packets and an inter-packet gap (IPG) between respective ones of the plurality of client packets. The method includes forming a 64B/66B-encoded client signal by encoding individual client packets of the plurality of client packets into a set of 64B/66B-encoded client blocks and filling the IPG between respective ones of the plurality of client packets with a set of 64B/66B idle blocks. The method further includes, generating a 64B/66B-encoded client thread signal by inserting thread operations, administration and maintenance (ThOAM) overhead for the sub1G packet-oriented client signal into the 64B/66B-encoded client signal. In one example, the ThOAM overhead for the sub1G packet-oriented client signal may be inserted as a Metro Transport Network (MTN) ordered set (OS) into the 64B/66B-encoded client signal to generate the 64B/66B-encoded client thread signal. The method continues by generating a rate adapted 64B/66B-encoded client thread signal by performing an idle mapping procedure (IMP) to modify a number of 64B/66B idle blocks in one or more of the sets of 64B/66B idle blocks of the 64B/66B-encoded client thread signal. The method continues by generating an MTN path signal by defining a plurality of pseudo-Ethernet packets in the MTN path, defining a thread channel within the plurality of pseudo-Ethernet packets for carrying the sub1G packet-oriented client signal, and mapping the rate adapted 64B/66B-encoded client thread signal into the defined thread channel within the plurality of pseudo-Ethernet packets.

In a particular example, a plurality of sub1G packet-oriented client signals may be received at a source node. In this example, the method includes generating a respective rate-adapted 64B/66B-encoded client thread signal for each of the plurality of sub1G packet-oriented client signals, defining a respective thread channel within the plurality of pseudo-Ethernet packets for carrying respective ones of the plurality of sub1G packet-oriented client signals, and mapping the respective rate-adapted 64B/66B-encoded client thread signals into the respective defined thread channel within the plurality of pseudo-Ethernet packets.

Focusing on a single sub1G packet-oriented client signal that was received at the source node, after the generation of the MTN path signal, the method includes, transmitting the MTN path signal from the source node over the MTN path, receiving the MTN path signal at an ingress of a sub1G-aware intermediate node of the MTN and extracting the rate adapted 64B/66B-encoded client thread signal from the plurality of pseudo-Ethernet packets of the MTN path signal. The method further includes, generating a modified rate adapted 64B/66B-encoded client thread signal by performing idle mapping procedure (IMP) rate adaptation of the extracted rate adapted 64B/66B-encoded client thread signal to modify the number of 64B/66B idle blocks in one or more sets of the 64B/66B idle blocks to match an egress thread channel rate of the sub1G-aware intermediate node. The method continues by generating an egress MTN path signal by defining a plurality of pseudo-Ethernet packets in the MTN path at an egress of the sub1G-aware intermediate mode, defining an egress thread channel within the plurality of pseudo-Ethernet packets for carrying the sub1G packet-oriented client signal, and mapping the modified rate adapted 64B/66B-encoded client thread signal into the defined egress thread channel within the plurality of pseudo-Ethernet packets. The method continues by transmitting the egress MTN path signal from the sub1G-aware intermediate node to a next node of the MTN or to a sink node.

When the egress MTN path signal arrives at a sink node, the method continues by extracting the sets of 64B/66B-encoded client blocks, the sets of 64B/66B idle blocks and the ThOAM from the modified rate adapted 64B/66B-encoded client thread signal and decoding respective sets of the extracted 64B/66B-encoded client blocks to recover the sub1G packet-oriented client signal.

In an additional example, a source node is provided for transmitting packet-oriented client data over a Metro Transport Network (MTN). The source node includes circuitry to receive a sub1G packet-oriented client signal at the source node, wherein the sub1G packet-oriented client signal comprises a plurality of client packets and an inter-packet gap (IPG) between respective ones of the plurality of client packets. The source node additionally comprises circuitry to form a 64B/66B-encoded client signal by encoding individual client packets of the plurality of client packets into a set of 64B/66B-encoded client blocks and filing the (IPG) between respective ones of the plurality of client packets with a set of 64B/66B idle blocks. The source node includes circuitry to insert thread operations, administration and maintenance (ThOAM) overhead for the sub1G packet-oriented client signal into the 64B/66B-encoded client signal to generate a 64B/66B-encoded client thread signal. In one example, the ThOAM overhead for the sub1G packet-oriented client signal may be inserted as a Metro Transport Network (MTN) ordered set (OS) into the 64B/66B-encoded client signal to generate the 64B/66B-encoded client thread signal. The source node further includes circuitry to perform an idle mapping procedure (IMP) to modify a number of 64B/66B idle blocks in one or more of the sets of 64B/66B-encoded idle blocks of the 64B/66B-encoded client thread signal to generate a rate adapted 64B/66B-encoded client thread signal. The circuitry of the source node additionally defines a plurality of pseudo-Ethernet packets in the MTN path, defines a thread channel within the plurality of pseudo-Ethernet packets for carrying the sub1G packet-oriented client signal, and maps the rate adapted 64B/66B-encoded client thread signal into the defined thread channel within the plurality of pseudo-Ethernet packets to generate an MTN path signal.

In one example, the sub1G packet-oriented client signal is a 1000 Mbit/s (1000BASE-x) stream employing 8B/10B code blocks, and the source node further includes circuitry to transcode the 8B/10B code blocks into 64B/66B code blocks to form the 64B/66B-encoded client signal.

In a particular example, a plurality of sub1G packet-oriented client signals may be received at a source node. In this example, the circuitry of the source node generates a respective rate-adapted 64B/66B-encoded client thread signal for respective ones of the plurality of sub1G packet-oriented client signals, defines a respective thread channel for carrying respective ones of the plurality of sub1G packet-oriented client signals and maps respective ones of the rate-adapted 64B/66B-encoded client thread signals into the respective defined thread channel within the plurality of pseudo-Ethernet packets to generate the MTN path signal.

Accordingly, in various examples of a system and method are provided for performing rate adaptation of sub1G packet-oriented client signals for transmission over a Metro Transport Network (MTN).

BRIEF DESCRIPTION OF THE DRAWINGS

For a fuller understanding reference should be made to the following detailed description, taken in connection with the accompanying drawings, in which:

FIG. 7 illustrates an example of 1023-block pseudo-Ethernet packets for carrying 990 blocks of the 480 multiplexed threads.

FIG. 8 illustrates an example of 1091-block pseudo-Ethernet packets for carrying 990 blocks of 480 multiplexed threads.

FIG. 9 illustrates an example of 545-block pseudo-Ethernet packets for carrying 526 blocks of the 480 multiplexed threads.

DETAILED DESCRIPTION OF THE INVENTION

Reference will now be made in detail to various examples, examples of which are illustrated in the accompanying drawings. While various examples are discussed herein, it will be understood that they are not intended to be limiting. On the contrary, the presented examples are intended to cover alternatives, modifications, and equivalents, which may be included within the spirit and scope of the various examples as defined by the appended claims. Furthermore, in this Detailed Description of the Invention, numerous specific details are set forth in order to provide a thorough understanding. However, examples may be practiced without one or more of these specific details. In other instances, well known methods, procedures, components, and circuits have not been described in detail as not to unnecessarily obscure aspects of the described examples.

It will be understood that, although the terms first, second, third, without limitation, may be used herein to describe various elements, components, regions, layers, and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In various examples, the present examples provide a novel system and method for carrying sub1G packet-oriented client signals through an ITU-T G.8312 Metro Transport Network (MTN). The present examples provide a common basis for rate adaptation and operations, administration and maintenance (OAM) overhead insertion for sub1G packet-oriented client signals for transmission over a Metro Transport Network (MTN) path.

Figure 1:
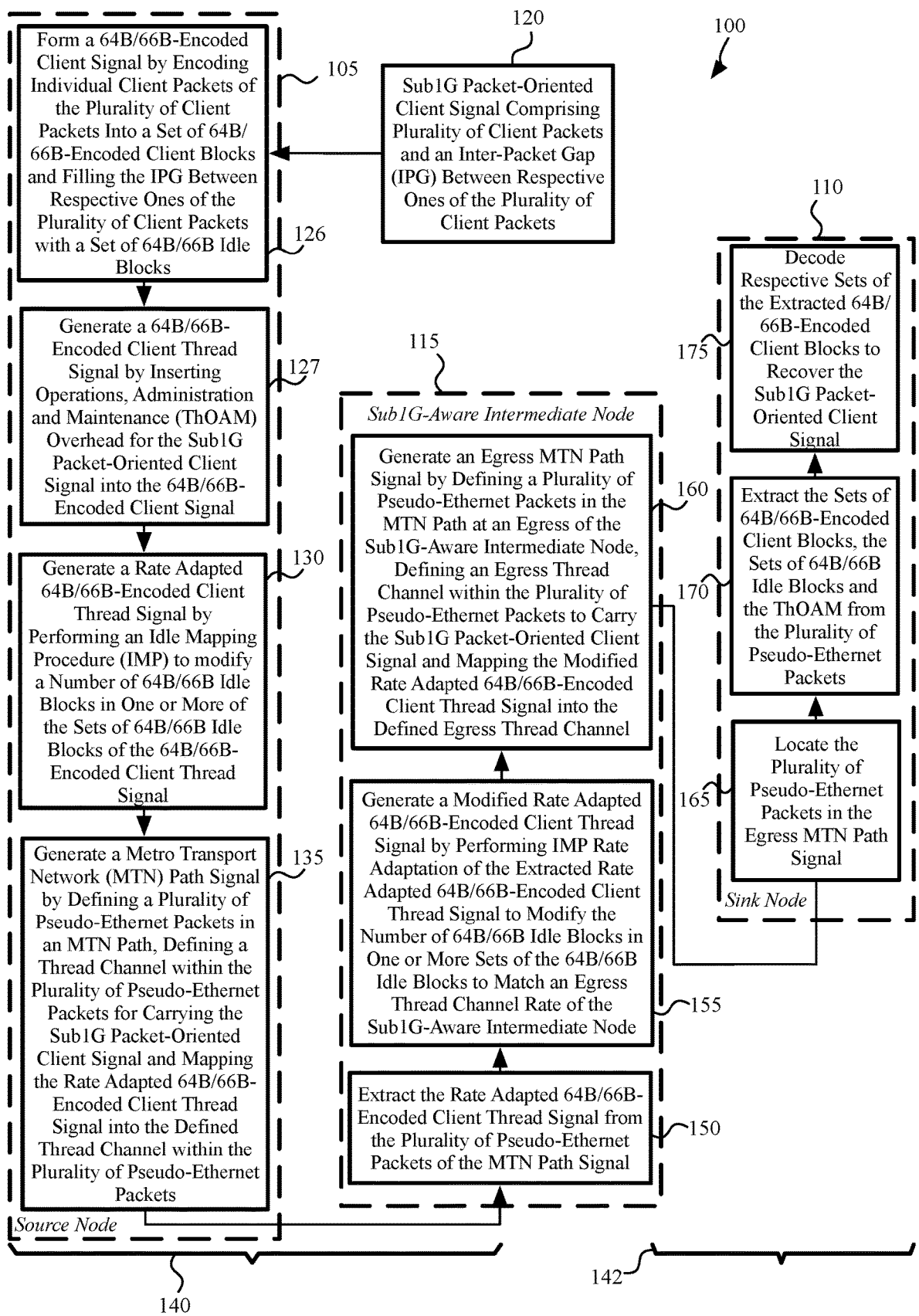
FIG. 1 is an example of functional blocks for a source node, an intermediate node and a sink node for mapping a sub1G packet-oriented client signal into an MTN path, performing IMP rate adaptation, and extracting the sub1G packet-oriented client signal from the MTN path.

With reference to FIG. 1, a system 100 for transmitting a sub1G packet-oriented client signal over a Metro Transport Network (MTN) includes a source node 105 comprising circuitry to receive a sub1G packet-oriented client signal 120, wherein the sub1G packet-oriented client signal 120 comprises a plurality of client packets and an inter-packet gap (IPG) between respective ones of the plurality of client packets. Circuitry of the source node 105 forms a 64B/66B-encoded client signal by encoding individual client packets of the plurality of client packets into a set of 64B/66B-encoded client blocks and filling the IPG between respective ones of the plurality of client packets with a set of 64B/66B idle blocks, 126.

In one example, the sub1G packet-oriented client signal is a 1000 Mbit/s Ethernet (1000BASE-x/GbE) stream employing 8B/10B code blocks. In this example, the 8B/10B code blocks of the sub1G packet-oriented client signal could be transcoded directly into 64B/66B code blocks in order to preserve the control code information, including ordered sets, of the sub1G packet-oriented client signal.

Circuitry of the source node 105 additionally generates a 64B/66B-encoded client thread signal by inserting thread operations, administration and maintenance (ThOAM) overhead for the sub1G packet-oriented client signal into the 64B/66B-encoded client signal, 127. In one example, the ThOAM overhead for the sub1G packet-oriented client signal is inserted as a Metro Transport Network (MTN) ordered set (OS) into the IPG of the 64B/66B-encoded client signal.

The circuitry of the source node 105 generates a rate adapted 64B/66B-encoded client thread signal by performing an idle mapping procedure (IMP) to modify a number of 64B/66B idle blocks in one or more of the sets of 64B/66B idle blocks of the 64B/66B-encoded client thread signal, 130. Given the variable rate of information arrival for sub1G packet-oriented client signals, IMP is better suited for rate adaptation than a Generic Mapping Procedure (GMP)-based approach. The IMP is performed within the client 64B/66B-encoded client thread signal where the IPG is visible and where there are adequate idle blocks to allow performing IMP. This allows a common IMP approach for both the MTN path and the sub1G packet-oriented client thread signals, with each being performed independently at the appropriate signal layer.

The circuitry of the source node 105 generates an MTN path signal by defining a plurality of pseudo-Ethernet packets in the MTN path, defining a thread channel within the plurality of pseudo-Ethernet packets for carrying the sub1G packet-oriented client thread signal, and mapping the rate adapted 64B/66B-encoded client thread signal into the defined thread channel within the plurality of pseudo-Ethernet packets, 135. In particular, the plurality of pseudo-Ethernet packets include a plurality of data bytes forming a payload area and the circuitry of the source node 105 segments the payload area into a plurality of thread channel members, assigns one or more of the plurality of thread channel members to the defined thread channel and maps the rate adapted 64B/66B-encoded client thread signal into the one or more of the plurality of thread channel members of the defined thread channel within the plurality of pseudo-Ethernet packets to generate the MTN path signal. The rate adapted 64B/66B-encoded client thread signal is then mapped into the one or more of the plurality of thread channel members of the defined thread channel within the plurality of pseudo-Ethernet packets. By mapping the rate adapted 64B/66B-encoded client thread signal into the thread channel members of the defined thread channel within the plurality of pseudo-Ethernet packets, the client control blocks (e.g., frame start or terminate, idles, or ordered sets) are not visible to the MTN path, and as such will not interfere with the MTN path processing. While mapping the rate adapted 64B/66B-encoded client thread signal into the thread channel members of the defined thread channel adds about a 3% signal overhead, this is considered acceptable for known applications. Rate adaptation of the 64B/66B-encoded client thread signal, as described in relation to 130, results in the rate adapted 64B/66B-encoded client thread signal filling the bandwidth provided by the defined thread channel within the plurality of pseudo-Ethernet packets in the MTN path.

The pseudo-Ethernet packet are "pseudo" Ethernet in the sense that they lack much of the overhead of standard Ethernet packets and may only follow the Ethernet basic physical coding sublayer (PCS) packet syntax, beginning with the/S/start control block and ending with a /T/ terminate control block. This syntax allows pseudo-Ethernet packet boundaries to be identified at sub1G-aware and sub1G-unaware nodes and ensures that a sub1G-unaware intermediate MTN node implementations can correctly identify the Ethernet inter-packet gap (IPG) for idle insertion and removal rate adaptation. However, since the pseudo-Ethernet packets are not processed by an Ethernet MAC, they may omit, for example, the Ethernet packet MAC overhead and the 32-bit cyclic redundancy check frame check sequence (CRC-32 FCS). Also, the pseudo-Ethernet packet lengths may be made much longer than the allowable Ethernet packet size in order to provide higher bandwidth efficiency.

The source node 105 transmits the MTN path signal over a first portion of the MTN path 140, to a sub1G-aware intermediate node 115 of the MTN.

The sub1G-aware intermediate node 115 receives the MTN path signal at an ingress. The sub1G-aware intermediate node 115 includes circuitry for extracting the rate adapted 64B/66B-encoded client thread signal from the plurality of pseudo-Ethernet packets of the MTN path signal, 150. The sub1G-aware intermediate node 115 includes circuitry to generate a modified rate adapted 64B/66B- encoded client thread signal by performing IMP rate adaptation of the extracted rate adapted 64B/66B-encoded client thread signal to modify the number of 64B/66B idle blocks in one or more sets of the 64B/66B idle blocks to match an egress thread channel rate of the sub1G-aware intermediate node 115, 155. The sub1G-aware intermediate node 115 additionally includes circuitry to generate an egress MTN path signal by defining a plurality of pseudo-Ethernet packets in the MTN path at an egress of the sub1G-aware intermediate node, defining an egress thread channel within the plurality of pseudo-Ethernet packets for carrying the sub1G packet-oriented client signal, and mapping the modified rate adapted 64B/66B-encoded client thread signal into defined egress thread channel 160. The sub1G-aware intermediate node 115 transmits the egress MTN path signal over a second portion of the MTN path 142 from the sub1G-aware intermediate node 115 to a next node of the MTN or to a sink node 110.

The sink node 110 includes circuitry to locate the plurality of pseudo-Ethernet packets in the egress MTN path signal received from the sub1G-aware intermediate node, 165. The sink node 110 additionally includes circuitry to extract the sets of 64B/66B-encoded client blocks, the sets of 64B/66B idle blocks and the ThOAM from the modified rate adapted 64B/66B-encoded client thread signal of the egress MTN path signal, 170. The sink node 110 further includes circuitry to decode respective sets of the extracted 64B/66B-encoded client blocks to recover the sub1G packet-oriented client signal, 175. The sets of 64B/66B idle blocks may be discarded.

Figure 2:
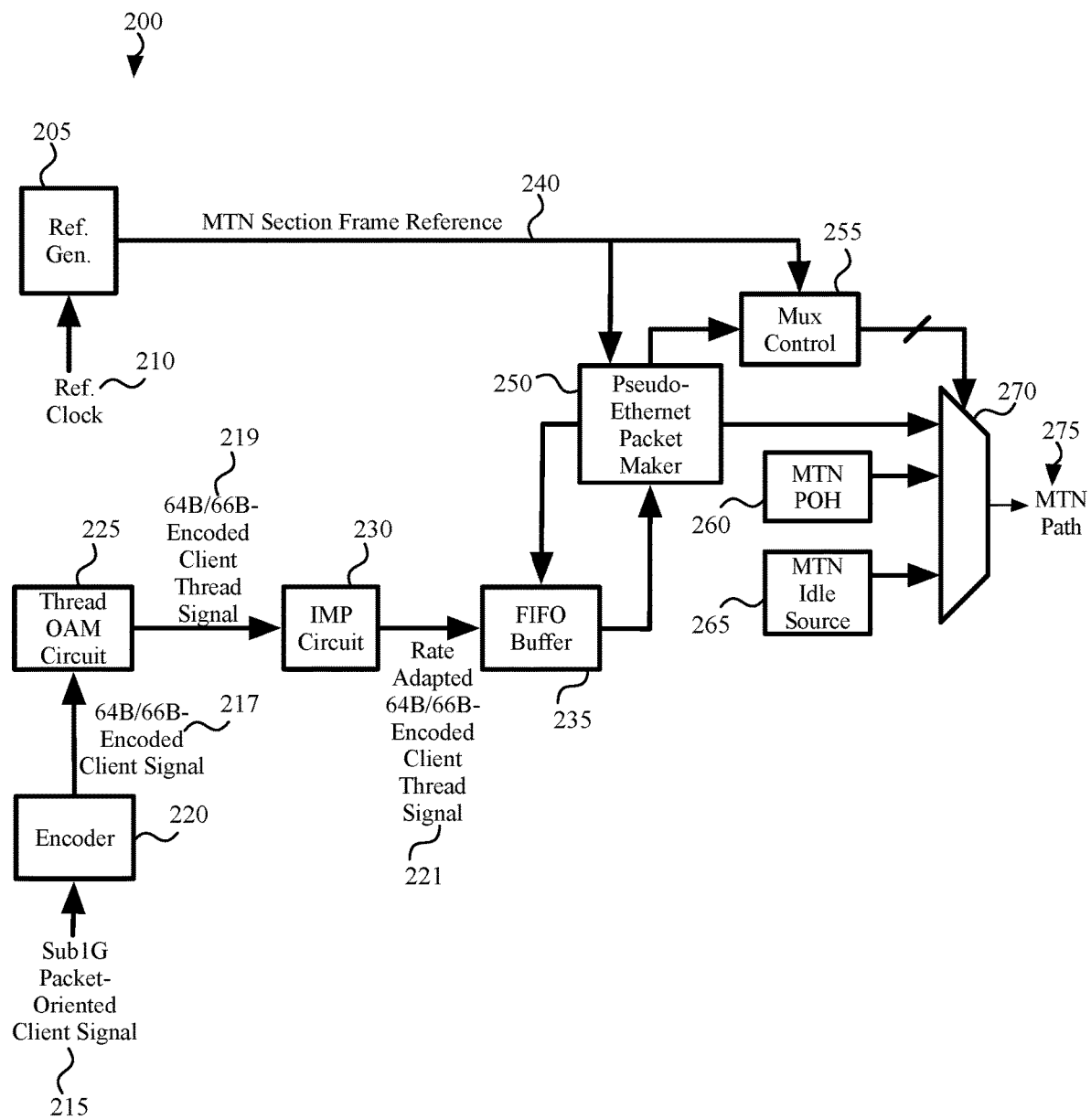
FIG. 2 illustrates an example block diagram of a source node for implementing IMP rate adaptation and mapping a sub1G packet-oriented client signal into an MTN path.

FIG. 2 illustrates an example block diagram of a source node, 200, such as the source node 105 in accordance with FIG. 1, wherein a rate adapted 64B/66B-encoded client thread signal is mapped into a thread channel within a plurality of pseudo-Ethernet packets for carrying the sub1G packet-oriented client signal.

With reference to FIG. 2, an MTN section frame reference 240 is generated by a reference generator 205 in response to a reference clock 210. A sub1G packet-oriented client signal 215 comprising a plurality of client packets and an interpacket gap (IPG) between respective ones of the plurality of client packets is provided to an encoder 220. The encoder 220 forms a 64B/66B-encoded client signal 217 by encoding individual client packets of the plurality of client packets into a set of 64B/66B-encoded client blocks and filling the IPG between respective ones of the plurality of client packets with a set of 64B/66B idle blocks. The 64B/66B-encoded client signal is then provided to a thread OAM circuit 225 which inserts thread operations, administration and maintenance (ThOAM) overhead for the sub1G packet-oriented client signal into the 64B/66B-encoded client signal to generate a 64B/66B-encoded client thread signal 219. An IMP circuit 230 then performs IMP to modify a number of 64B/66B idle blocks in one or more of the sets of 64B/66B idle blocks of the 64B/66B-encoded client thread signal to generate a rate adapted 64B/66B-encoded client thread signal 221.

While in the example illustrated in FIG. 2, the insertion of the ThOAM is performed by the thread OAM circuit 225 prior to the IMP circuit 230 performing IMP, this is not intended to be limiting and, in another example, IMP may be performed prior to the ThOAM insertion, i.e. IMP circuit 230 may precede thread OAM circuit 225.

The rate adapted 64B/66B-encoded client thread signal 221 is provided to a first in first out (FIFO) buffer 235. A pseudo-Ethernet packet maker 250 defines a plurality of pseudo-Ethernet packets with a /S/, a /T/ and N−2 64B/66B data blocks. In a particular example, the data bytes of the N−2 64B/66B data blocks form a payload area. In an alternative example, a combination of the data bytes of the N−2 64B/66B data blocks and data bytes of the /T/ data block form the payload area. The pseudo-Ethernet packet maker 250 defines a thread channel within the plurality of pseudo-Ethernet packets for carrying the sub1G packet-oriented client signal and maps the rate adapted 64B/66B-encoded client thread signal from the FIFO buffer 235 into the defined thread channel within the plurality of pseudo-Ethernet packets to generate the MTN path signal. In particular, the pseudo-Ethernet packet maker 250 segments the payload area into a plurality of thread channel members, assigns one or more of the plurality of thread channel members to the defined thread channel and maps the rate adapted 64B/66B-encoded client thread signal into the one or more of the plurality of thread channel members of the defined thread channel within the plurality of pseudo-Ethernet packets to generate the MTN path signal. The pseudo-Ethernet packet maker 250 provides the pseudo-Ethernet packets to a multiplexer 270, which is controlled by a multiplexer controller 255. The multiplexer controller 255 is controlled by the pseudo-Ethernet packet maker 250 and the MTN section frame reference 240 to direct the multiplexer 270 to select among the pseudo-Ethernet packets from the pseudo-Ethernet packet maker 250, idle blocks in the IPG between pseudo-Ethernet packets from the MTN idle source 265, and the MTN path overhead (POH) insertion opportunities in accordance with International Telecommunication Union Telecommunication Standardization Sector (ITU-T) Rec. G.8312 MTN from the MTN POH 260. The output of the multiplexer 270 is provided to the MTN path 275.

The following examples describe mapping of the rate adapted 64B/66B-encoded client thread signal into the MTN path in more detail. A sub1G channel is arranged to effectively carry the information from a 10 Mbit/s 10BASE Ethernet interface, which may result in providing 480×10 Mbit/s channels within a 5 Gbits/s MTN path. A N×5 GBits/s MTN path would provide N×480×10 Mbit/s channels. As described above, the rate adapted 64B/66B-encoded client thread signal is carried as a bit stream in the thread channel members of the defined thread channel within the plurality of pseudo-Ethernet packets. Multiplexing may be performed to accommodate multiple sub1G packet-oriented client signals wherein the MTN path consists of a set of pseudo-Ethernet packets into which the multiple sub1G packet-oriented client signals are multiplexed (interleaved).

Figure 3A:
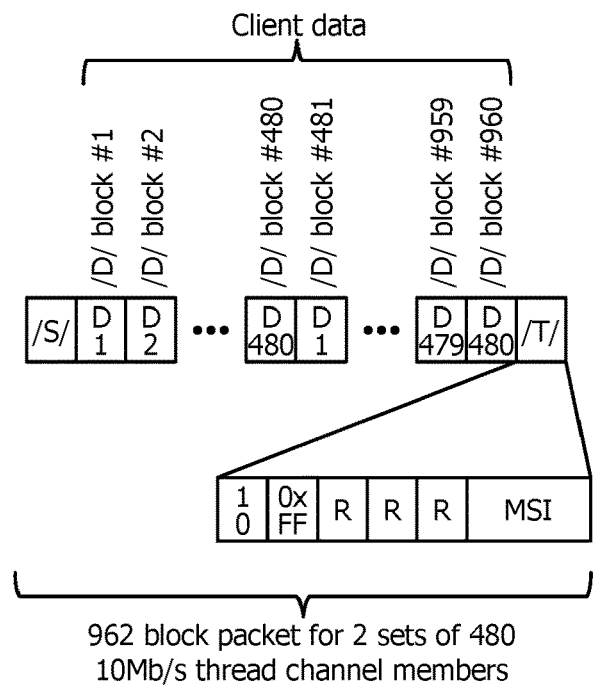
FIG. 3A illustrates an example pseudo-Ethernet packet format having rate adapted 64B/66B-encoded client thread signal mapped into a payload area of data blocks of the pseudo-Ethernet packet 64-bits at a time with each MTN path data block (/D/) carrying a single sub1G packet-oriented client signal.

FIG. 3A illustrates a 962-block pseudo-Ethernet packet wherein the payload area of the pseudo-Ethernet packet is divided into a plurality of thread channel members, each 64 bits wide. As such, each thread channel member has a capacity of 10 Mbit/s and fits into the payload area of a /D/ block of the pseudo-Ethernet packet. The thread channel members are numbered 1 to 480 and a thread channel that is N×10 Mbit/s is allocated a set of N thread channel members.

Figure 3B:
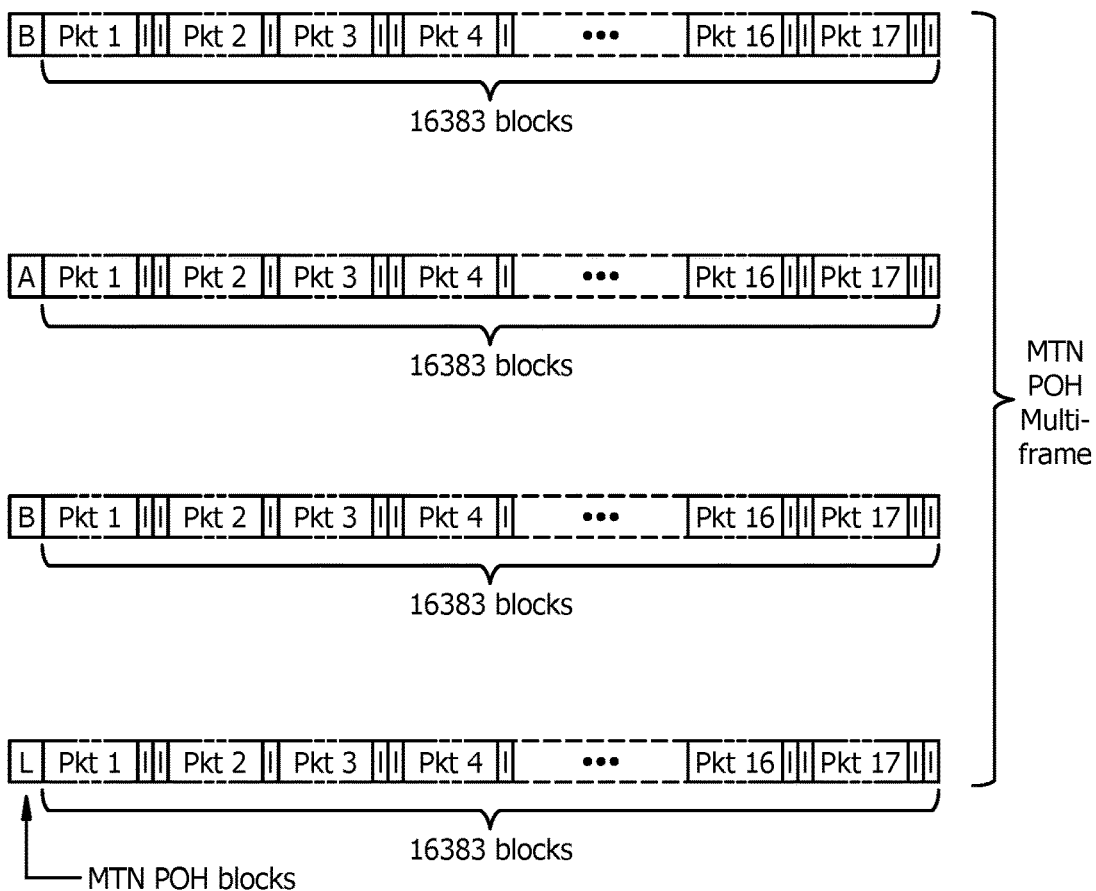
FIG. 3B illustrates an example of the pseudo-Ethernet packet format of FIG. 3A with 962-block packets carrying multiples of 480 multiplexed threads.

FIG. 3B illustrates the frame format for MTN path overhead (POH) insertion opportunities in accordance with ITU-T Rec. G.8312 MTN, wherein B, A and L are different types of POH ordered set (OS) blocks in accordance with the ITU-T Rec. G.8312 MTN standard. The MTN POH frame begins with the B POH block position located in the position prior to the appearance of the A POH block position. Note that in accordance ITU-T G.8312, there may be times when no POH is transmitted in the L or A POH block positions. Consequently, it is understood in the description below that the pair of B POH blocks provide the reference points in the MTN POH frame, with the L or A blocks inserted into their respective positions within the MTN POH frame when they are applicable. If no POH is transmitted in the A or L block positions, an idle block may occupy that position without loss of generality. MTN POH blocks are nominally separated by n*16384 64B/66B blocks, where n represents the number of MTN Section layer 5 Gbit/s calendars slots carrying the MTN Path. For compatibility with the MTN POH period requirements the pseudo-Ethernet packet length may be chosen such that it makes more efficient use of the interval between MTN POH blocks and provides sufficient idle blocks for MTN Path IMP. For implementation convenience, the pseudo-Ethernet packet length may be chosen such that an integer number of pseudo-Ethernet packets appear between each MTN POH block location. For example, a fixed number of pseudo-Ethernet packets may occupy the 16383 block positions between MTN path overhead positions.

In one example, the circuitry 135 of the source node 105 that maps the rate adapted 64B/66B-encoded client thread signal into the defined thread channel within the plurality of pseudo-Ethernet packets comprises circuitry to map the rate adapted 64B/66B-encoded client thread signal from a single client, 64-bits at a time, into the thread channel members of the defined thread channel within the plurality of pseudo-Ethernet packets. With reference to FIG. 3A and FIG. 3B, in this example, the bits of the rate adapted 64B/66B encoded client thread signal are mapped 64-bits at a time into the data blocks (/D/) blocks of the MTN path pseudo-Ethernet packets such that an individual MTN path pseudo-Ethernet packet data blocks carries information from a single client. This example is illustrated in FIG. 3A. In this specific example, two data blocks per pseudo-Ethernet packet are dedicated to a specific 10 Mbit/s thread channel member. The thread channel of a packet client may be allocated one or more thread channel members. As illustrated in FIG. 3B, the packet structure of FIG. 3A allows 17 pseudo-Ethernet packets and 29 idles per MTN path frame row and sufficient bandwidth to carry 480 64B/66B block-coded 10 Mbit/s sub1G packet-oriented client streams. FIG. 3A also illustrates the potential use of the data bytes within the /T/ termination block for carrying overhead information, such as a multiplex structure indication (MSI). The data bytes of the/S/start block are similarly available if needed.

Figure 4A:
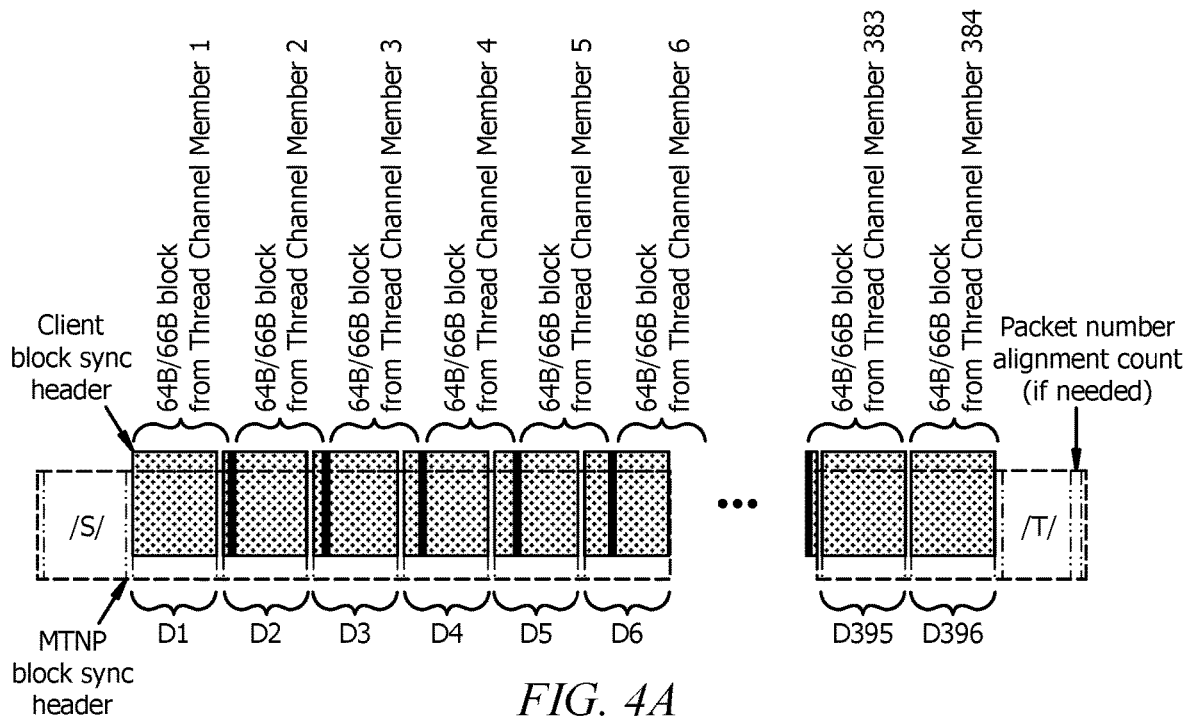
FIG. 4A illustrates an example pseudo-Ethernet packet format rate adapted 64B/66B-encoded client thread signal mapped into merged payload area of data blocks of the pseudo-Ethernet packet 66-bits at a time with respective 398-block pseudo-Ethernet packets carrying 64B/66B-encoded blocks from 384 of the 480 rate adapted 64B/66B-encoded client thread signals.
Figure 4B:
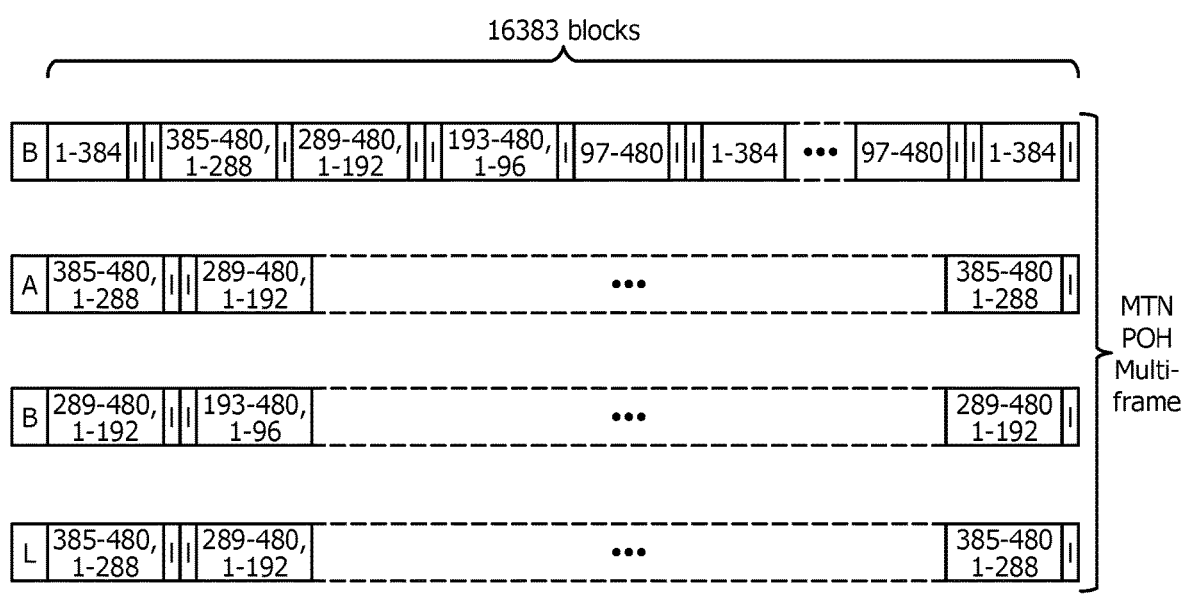
FIG. 4B illustrates an example of the pseudo-Ethernet packet format of FIG. 4A with 398-block packets for carrying 384 of the 480 multiplexed threads.

In another example, the circuitry 135 of the source node 105 that maps the rate adapted 64B/66B-encoded client thread signal into the defined thread channel within a plurality of pseudo-Ethernet packets of the MTN path to generate the MTN path signal comprises circuitry to map the rate adapted 64B/66B-encoded client thread signal from a single client into the at least one thread channel member of the data payload area of the plurality of pseudo-Ethernet packets of the MTN path. With reference to FIG. 4A and FIG. 4B, in this alternate example, the payload bits of the set of 64B/66B data blocks within an MTN path pseudo-Ethernet packet can be regarded as a single combined payload area rather than assigning individual 64B/66B data blocks to individual thread channel members. The merged payload area is divided into chunks of 66 contiguous bits, where each chunk is assigned to a 66 bit wide thread channel member. Each thread channel member accommodates an entire 64B/66B block of a rate adapted 64B/66B encoded client thread signal. Consequently, the mapping retains 66-bit block alignment, which removes the need for recovering the 64B/66B block alignment of the rate adapted 64B/66B encoded client thread signal when it is extracted from the pseudo-Ethernet packets of the MTN path.

An example pseudo-Ethernet packet for 66-bit mapping into the merged payload area is illustrated in FIG. 4A. In this example, a 398-block pseudo-Ethernet packet carries 384 of the 480 thread channel members, where each thread channel member is 66 bits wide. The pseudo-Ethernet packet in FIG. 4A is the first one in the sequence of five pseudo-Ethernet packets before the first thread channel member is once again located at the start of the pseudo-Ethernet packet. FIG. 4B illustrates how the pseudo-Ethernet packet of FIG. 4A may map into an MTN path frame structure using 41×398-block pseudo-Ethernet packets and 65 idles per MTN path frame row. Since the five-packet repetition period does not align to the MTN path frame, a packet number alignment count (packet multiframe alignment) may be provided, as indicated in FIG. 4A. The packet number alignment count could be located in bits of either the /S/, /T/ or a /D/ block.

Other potential packet length and frame structures are illustrated in FIG. 5, FIG. 6, FIG. 7, FIG. 8 and FIG. 9. The pseudo-Ethernet packets would have the same basic format as in FIG. 5.

Figure 5:
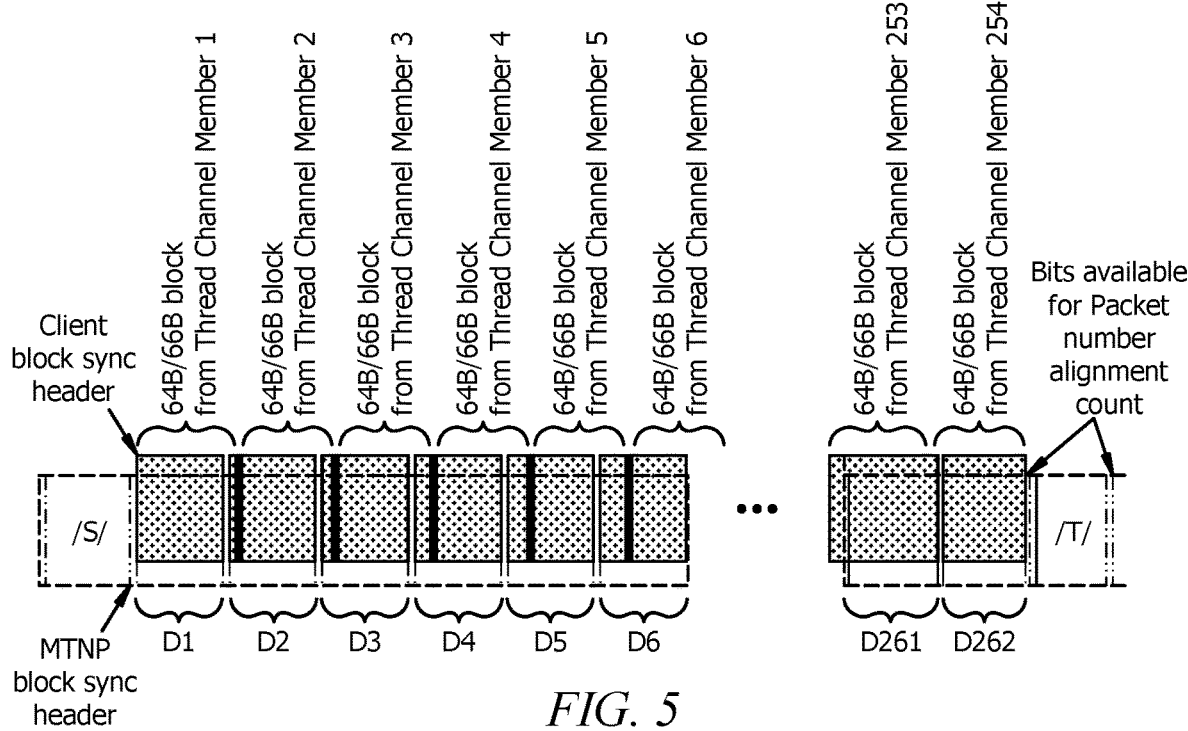
FIG. 5 illustrates an example pseudo-Ethernet packet format for 66-bit mapping of rate adapted 64B/66B-encoded client thread signals into merged payload areas of data blocks with respective 264-block pseudo-Ethernet packets carrying 64B/66B-encoded blocks from 254 clients of the 480 rate adapted 64B/66B-encoded client thread signals.

An example pseudo-Ethernet packet for 66-bit mapping of thread channel members into the merged payload area is illustrated in FIG. 5. In this example, a 264-block pseudo-Ethernet packet carries 64B/66B-encoded blocks from 254 clients. The pseudo-Ethernet packet in FIG. 5 is the first one in the sequence of 240 pseudo-Ethernet packets before the first (#1) thread channel member is once again located at the start of the pseudo-Ethernet packet. Since the 240-packet repetition period does not align to the MTN path frame, bits available for a packet number alignment count (packet multiframe alignment) may be provided, as indicated in FIG. 5. The bits available for the packet number alignment count could be located in bits of either the /S/, /T/ or a /D/ block.

Figure 6:
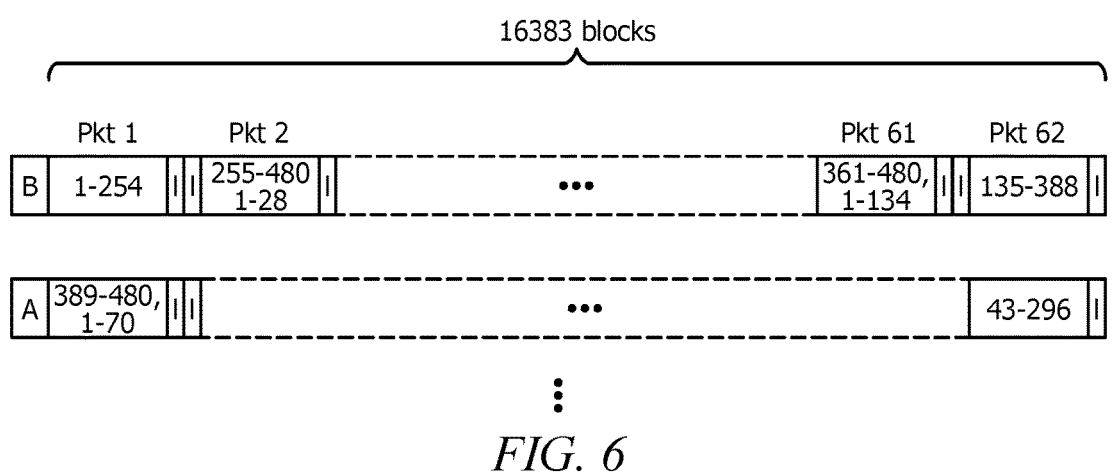
FIG. 6 illustrates an example of the pseudo-Ethernet packet format of FIG. 5 with 264-block packets for carrying 254 of 480 multiplexed threads.

FIG. 6 illustrates a structure with 62 pseudo-Ethernet packets, each 264 blocks long, carrying 64B/66B-encoded blocks from 254 clients as illustrated in FIG. 5. This structure may represent the shortest achievable pseudo-Ethernet packet length, when the number of pseudo-Ethernet packets per MTN path frame row is an integer. The repetition period before the thread channel member alignment within the pseudo-Ethernet packets repeat is 240 packets. Similar to the structure of FIG. 4A, a packet number alignment field may be provided. However, since 254*(66/64)=261.9375, the last pseudo-Ethernet packet data block will have 4 bits that are not occupied with client information. As indicated in FIG. 5, these bits could potentially be used in combination with bits from the /S/ or /T/ to form the required 7-bit packet number alignment field.

Figures 7, 8, 9:
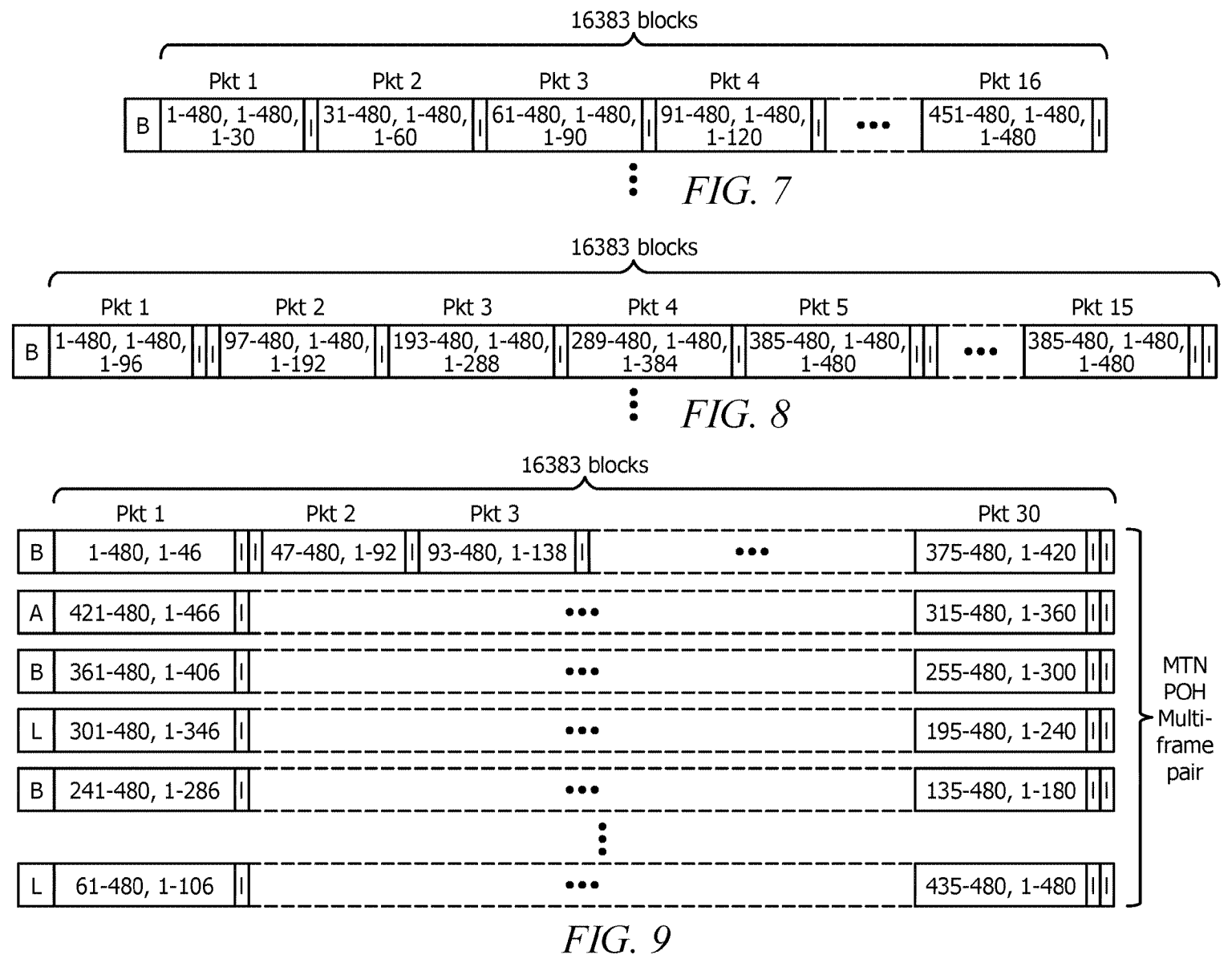

The example of FIG. 7 uses 16 pseudo-Ethernet packets, each carrying 990 thread channel member positions, wherein 990=(2*480)+30. Since the combined payload area of the 16 pseudo-Ethernet packets per MTN path row carries a total number of thread channel member positions that is evenly divisible by 480, there may be no need for a packet number alignment field in this structure. In other words, the set of 16 pseudo-Ethernet packets provide 990*16=15840 thread channel member positions. Since 15840/480=33 they provide exactly 33 positions for each of the 480 thread channel members. Thus, the alignment repeats at the beginning of each row. Similar to the pseudo-Ethernet packet format of FIG. 5, the 4 unused bits in the last packet data block could potentially be used for other purposes.

Similar to the structure of FIG. 7, the example of FIG. 8 also provides an equal integer number of occurrences in each of the 480 thread channel members per MTN path frame row, and therefore a packet alignment number field may not be required. With this structure, similar to FIG. 4A, there may be no unused data block bits in the pseudo-Ethernet packet.

Another example packet and frame structure is shown in FIG. 9. In this example, the repetition period before the thread channel member alignment within the pseudo-Ethernet packets repeats is a convenient integer number of MTN path frame rows. In this example, the period is eight rows, which corresponds to a pair of MTN path frames. If the pseudo-Ethernet packet beginning with data from the first thread channel member immediately follows the "B" overhead block at the beginning of the MTN path frame then only a single alignment indicator bit may be required, since this would occur in every other frame. Similar to FIG. 5, the pseudo-Ethernet packet may have bits available at the end of the last data block for the alignment bit. Note that rather than locating the unused MTN path data field bits in the last data block, they could be located in the first data block of the pseudo-Ethernet packet with the client words shifted accordingly. Other examples for which the repetition period is exactly two MTN path frames are: using 20×816-block pseudo-Ethernet packets per row, each carrying 789 client thread words; and 15×1087-block pseudo-Ethernet packets, each carrying 1052 client thread words.

Note that it may not be necessary to strictly have an integer number of pseudo-Ethernet packets between MTN Path overhead blocks. However, having an integer number of pseudo-Ethernet packets between MTN Path overhead blocks may allow the regular path overhead block locations to provide additional timing information regarding the MTN Path source.

Figure 10:
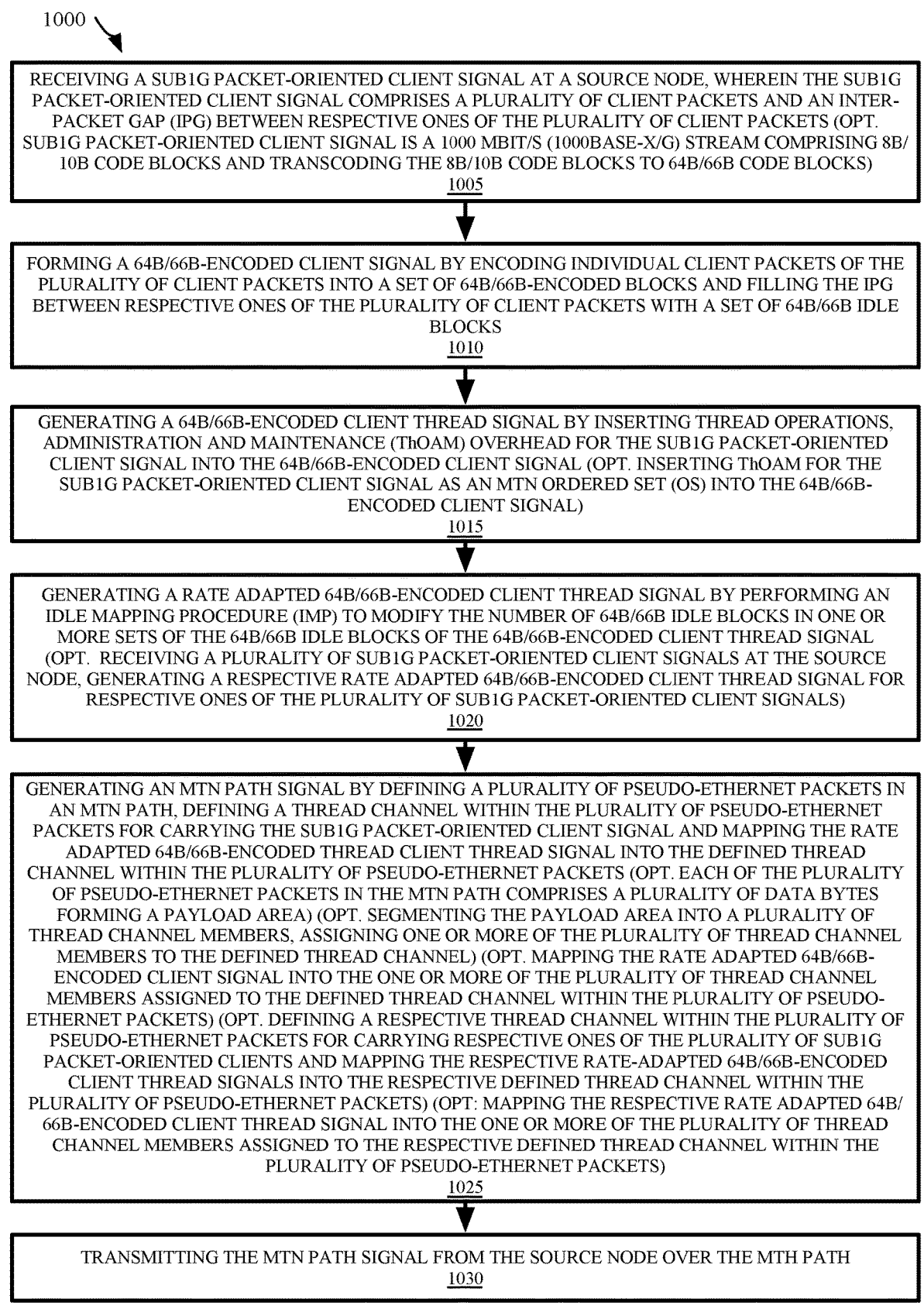
FIG. 10 is an example flow diagram illustrating a method for performing rate adaptation of packet-oriented client data for transmission over an MTN.

FIG. 10 illustrates a flow diagram 1000 for an example of the method for performing rate adaptation of packet-oriented client data for transmission over a Metro Transport Network (MTN). The method 1000 may be performed by a source node 105, as illustrated in FIG. 1.

At FIG. 10, the method 1000 begins at operation 1005 by receiving a sub1G packet-oriented client signal at a source node, wherein the sub1G packet-oriented client signal comprises a plurality of client packets and an inter-packet gap (IPG) between respective ones of the plurality of client packets. In one example, the sub1G packet-oriented client signal may be a 1000 Mbit/s Ethernet (1000BASE-x/GbE) stream employing 8B/10B code blocks. In this example, the 8B/10B code blocks of the sub1G packet-oriented client stream could be transcoded directly into 64B/66B code blocks in order to preserve the control code information, including ordered sets, of the 8B/10B stream.

The method 1000 continues at operation 1010 by forming a 64B/66B-encoded client signal by encoding individual client packets of the plurality of client packets into a set of 64B/66B-encoded blocks and filling the IPG between respective ones of the plurality of client packets with a set of 64B/66B idle blocks.

At operation 1015, the method 1000 continues by generating a 64B/66B-encoded client thread signal by inserting thread operations, administration and maintenance (ThOAM) overhead for the sub1G packet-oriented client signal into the 64B/66B-encoded client signal. In one example, the ThOAM is inserted as a MTN ordered set (OS) into the 64B/66B-encoded client signal.

The method 1000 continues at operation 1020 by generating a rate adapted 64B/66B-encoded client thread signal by performing an idle mapping procedure (IMP) to modify a number of 64B/66B idle blocks in one or more of the sets of 64B/66B idle blocks of the 64B/66B-encoded client thread signal. In one example, a plurality of sub1G packet-oriented client signals may be received at the source node and operation 1020 includes generating a respective rate adapted 64B/66B-encoded client thread signal for respective ones of the plurality of sub1G packet-oriented client signals.

It is noted that operation 1015 and operation 1020 may be performed in either order.

The method 1000 continues at operation 1025 by generating an MTN path signal by defining a plurality of pseudo-Ethernet packets in the MTN path, defining a thread channel within the plurality of pseudo-Ethernet packets for carrying the sub1G packet-oriented client signal and mapping the rate adapted 64B/66B-encoded client thread signal into the defined thread channel within the plurality of pseudo-Ethernet packets. In one example, wherein a plurality of sub1G packet-oriented client signals are received, operation 1025 includes defining a respective thread channel within the plurality of pseudo-Ethernet packet for carrying a respective one of the sub1G packet-oriented client signals and mapping the respective rate adapted 64B/66B-encoded client thread signal into the respective defined thread channel within the plurality of pseudo-Ethernet packets. In particular, respective ones of the plurality of pseudo-Ethernet packets in the MTN path comprise a plurality of data bytes forming a payload area and wherein generating the MTN path signal comprises segmenting the payload area into a plurality of thread channel members, defining the thread channel within the plurality of pseudo-Ethernet packets by assigning one or more of the plurality of thread channel members to the defined thread channel and mapping the rate adapted 64B/66B-encoded client thread signal into the one or more of the plurality of thread channel members assigned to the defined thread channel within the plurality of pseudo-Ethernet packets.

In one example, operation 1025 includes mapping the rate adapted 64B/66B-encoded client thread signal from a single sub1G packet-oriented client signal into one or more of the plurality of thread channel members assigned to the defined thread channel within the plurality of pseudo-Ethernet packets. In another example, wherein a plurality of sub1G packet-oriented client signals are received at the source, operation 1025 includes mapping the respective rate adapted 64B/66B-encoded client thread signal from the plurality of sub1G client signals into one or more of the plurality of thread channel members assigned to the the respective defined thread channel within the plurality of pseudo-Ethernet packets.

The method concludes at operation 1030 by transmitting the MTN path signal from the source node over the MTN path.

Figure 11A:
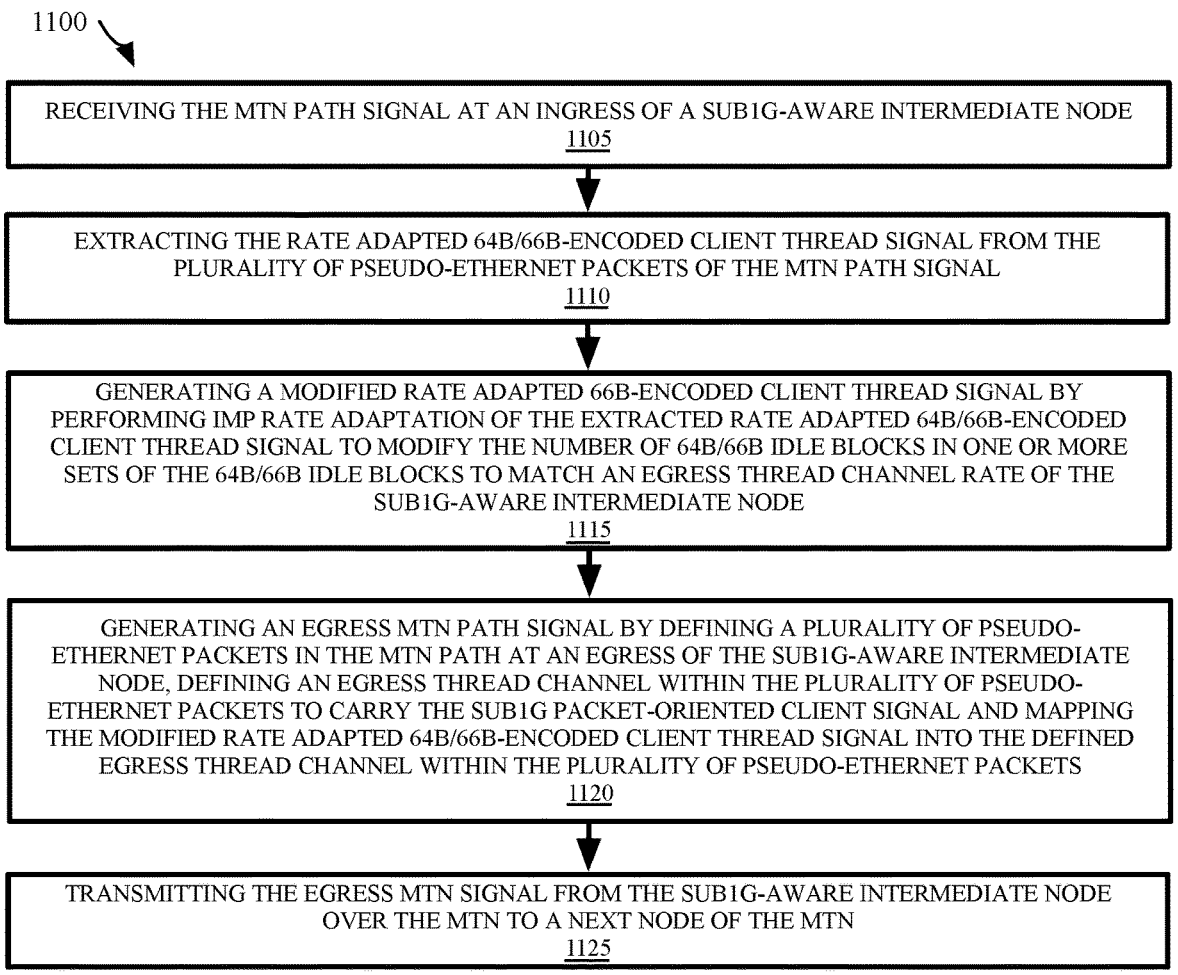
FIG. 11A is an example flow diagram illustrating a method for performing rate adaption at a sub1G-aware intermediate node of the MTN.

FIG. 11A illustrates a flow diagram 1100 of a method for performing rate adaptation of the MTN path signal generated at a source node 105 by a sub1G-aware intermediate node. The method 1100 may be performed by a sub1G-aware intermediate node 115, as illustrated in FIG. 1.

The method 1100 begins at operation 1105 by receiving the MTN path signal at an ingress of the sub1G-aware intermediate node.

At operation 1110, the method 1100 continues by extracting the rate adapted 64B/66B-encoded client thread signal from the plurality of pseudo-Ethernet packets of the MTN path signal.

At operation 1115, the method 1100 continues by generating a modified rate adapted 64B/66B-encoded client thread signal by performing IMP rate adaptation of the extracted rate adapted 64B/66B-encoded client thread signal to modify the number of 64B/66B idle blocks in one or more sets of the 64B/66B idle blocks to match an egress thread channel rate of the sub1G-aware intermediate node.

At operation 1120, the method 1100 continues by generating an egress MTN path signal by defining a plurality of pseudo-Ethernet packets in the MTN path at an egress of the sub1G-aware intermediate node, defining an egress thread channel within the plurality of pseudo-Ethernet packets to carry the sub1G packet-oriented client signal and mapping the modified rate adapted 64B/66B-encoded client thread signal into the defined egress thread channel within a plurality of pseudo-Ethernet packets.

The method 1100 concludes at operation 1125 by transmitting the egress MTN path signal from the sub1G-aware intermediate node to a next node of the MTN. The next node of the MTN may be another sub1G-aware intermediate node or a sink node.

Figure 11B:
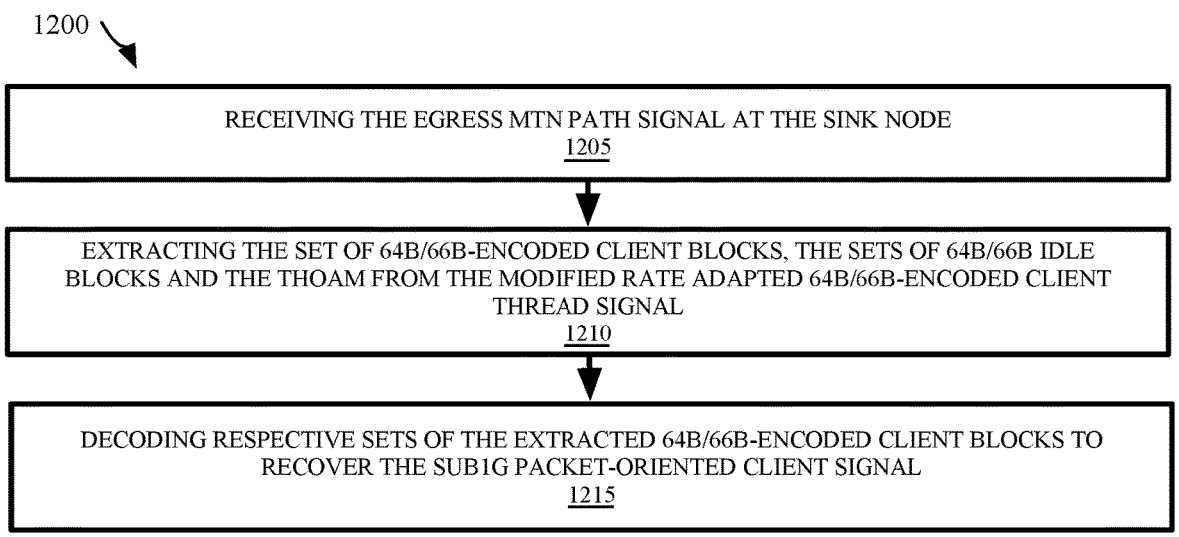
FIG. 11B is an example flow diagram illustrating a method for performing data extraction at a sink node of the MTN.

FIG. 11B illustrate a flow diagram 1200 of a method for recovering the packet-oriented client data from the egress MTN path signal received at a sink node. The method 1200 may be performed by a sink node 110, as illustrated in FIG. 1.

The method 1200 begins at operation 1205 by receiving the egress MTN path signal at the sink node.

The method 1200 continues at operation 1210 by extracting the sets of 64B/66B-encoded client blocks, the sets of 64B/66B idle blocks and the ThOAM from the modified rate adapted 64B/66B encoded client thread signal.

The method 1200 concludes at operation 1215 by decoding respective sets of extracted 64B/66B-encoded client blocks to recover the sub1G packet-oriented client signal.

The various exemplary systems and methods described above provide for carrying sub1G packet-oriented client streams over an MTN path. The sub1G packet-oriented client streams are rate adapted into an MTN thread channel rate using IMP, and thread OAM is added to the stream. The client stream, the thread OAM and idles added to the stream are invisible to the MTN path so that they do not impact MTN path processing.

In various examples, portions of the system of the present examples may be implemented in a Field Programmable Gate Array (FPGA) or Application Specific Integrated Circuit (ASIC). As would be appreciated by one skilled in the art, various functions of circuit elements may also be implemented as processing steps in a software program. Such software may be employed in, for example, a digital signal processor, a network processor, a microcontroller or general-purpose computer.

What is claimed is:

1. A method comprising:
   receiving a sub1G packet-oriented client signal at a source node, wherein the sub1G packet-oriented client signal comprises a plurality of client packets and an inter-packet gap (IPG) between respective ones of the plurality of client packets;
   forming a 64B/66B-encoded client signal by encoding individual client packets of the plurality of client packets into a set of 64B/66B-encoded client blocks and filling the IPG between respective ones of the plurality of client packets with a respective set of 64B/66B idle blocks;
   generating a rate adapted 64B/66B-encoded client thread signal by inserting thread operations, administration and maintenance (ThOAM) overhead for the sub1G packet-oriented client signal into the 64B/66B-encoded client signal and performing an idle mapping procedure (IMP) to modify a number of 64B/66B idle blocks in one or more of the sets of 64B/66B idle blocks; and
   generating a Metro Transport Network (MTN) path signal by defining a plurality of pseudo-Ethernet packets in an MTN path, defining a thread channel within the plurality of pseudo-Ethernet packets for carrying the sub1G packet-oriented client, and mapping the rate adapted 64B/66B-encoded client thread signal into the defined thread channel within the plurality of pseudo-Ethernet packets.

2. The method of claim 1, wherein inserting ThOAM overhead for the sub1G packet-oriented client signal into the 64B/66B-encoded client signal comprises inserting the ThOAM overhead as a MTN ordered set (OS) into the 64B/66B-encoded client signal.

3. The method of claim 1, wherein receiving the sub1G packet-oriented client signal at the source node comprises receiving a plurality of sub1G packet-oriented client signals at the source node and wherein:
   generating the rate adapted 64B/66B-encoded client thread signal comprises generating a respective rate adapted 64B/66B-encoded client thread signal for respective ones of the plurality of sub1G packet-oriented client signals; and
   generating the MTN path signal comprises defining a respective thread channel within the plurality of pseudo-Ethernet packets for carrying the respective ones of the plurality of sub1G packet-oriented clients and mapping the respective rate-adapted 64B/66B-encoded client thread signals into the respective defined thread channel within the plurality of pseudo-Ethernet packets.

4. The method of claim 1, wherein the sub1G packet-oriented client signal is a 1000 Mbit/s (1000BASE-x/G) stream employing 8B/10B code blocks, wherein the method comprises transcoding the 8B/10B code blocks into 64B/66B code blocks to form the 64B/66B-encoded client signal.

5. The method of claim 1, wherein the plurality of pseudo-Ethernet packets in the MTN path respectively comprise a plurality of data bytes forming a payload area and wherein generating the MTN path signal by defining a plurality of pseudo-Ethernet packets in an MTN path comprises segmenting the payload area into a plurality of thread channel members and wherein defining the thread channel within the plurality of pseudo-Ethernet packets for carrying the sub1G packet-oriented client comprises assigning one or more of the plurality of thread channel members to the defined thread channel.

6. The method of claim 5, wherein mapping the rate adapted 64B/66B-encoded client thread signal into the defined thread channel within the plurality of pseudo-Ethernet packets comprises mapping the rate adapted 64B/66B-encoded client thread signal into the one or more of the plurality of thread channel members assigned to the defined thread channel within the plurality of pseudo-Ethernet packets.

7. The method of claim 6, wherein mapping the rate adapted 64B/66B-encoded client thread signal into the defined thread channel within the plurality of pseudo-Ethernet packets comprises mapping the rate adapted 64B/66B-encoded client thread signal from a single sub1G packet-based client signal into the plurality of thread channel members of the defined thread channel within the plurality of pseudo-Ethernet packets.

8. The method of claim 3, wherein the plurality of pseudo-Ethernet packets in the MTN path respectively comprise a plurality of data bytes forming a payload area and wherein generating the MTN path signal comprises segmenting the payload area into a plurality of thread channel members and assigning one or more of the plurality of thread channel members to the respective defined thread channel.

9. The method of claim 8, wherein mapping the respective rate adapted 64B/66B-encoded client thread signal into the respective defined thread channel within the plurality of pseudo-Ethernet packets comprises mapping the respective rate adapted 64B/66B-encoded client thread signal into the one or more of the plurality of thread channel members assigned to the respective defined thread channel within the plurality of pseudo-Ethernet packets.

10. The method of claim 1, comprising:
transmitting the MTN path signal over the MTN path;
receiving the MTN path signal at an ingress of a sub1G-aware intermediate node;
extracting the rate adapted 64B/66B-encoded client thread signal from the plurality of pseudo-Ethernet packets;
generating a modified rate adapted 64B/66B-encoded client thread signal by modifying a number of 64B/66B idle blocks in one or more of the sets of 64B/66B idle blocks of the extracted rate adapted 64B/66B-encoded client thread signal to match an egress channel rate of the sub1G-aware intermediate node;
generating an egress MTN path signal by defining an egress thread channel within the plurality pseudo-Ethernet packet for carrying the sub1G packet-oriented client signal and mapping the modified rate adapted 64B/66B-encoded client thread signal into the pseudo-Ethernet packets of the defined egress thread channel; and
transmitting the egress MTN path signal to a next node of the MTN.

11. The method of claim 10, wherein the next node of the MTN is selected from a next sub1G-aware intermediate node and a sink node.

12. The method of claim 10, wherein the next node of the MTN is a sink node, the method comprising:
receiving the egress MTN path signal at the sink node;
locating the plurality of pseudo-Ethernet packets in the egress MTN path signal;
extracting one or more sets of 64B/66B-encoded client blocks, one or more sets of 64B/66B idle blocks and the ThOAM overhead from the located plurality of pseudo-Ethernet packets; and
decoding the extracted sets of 64B/66B-encoded client blocks to recover the sub1G packet-oriented client signal.

13. A method comprising:
receiving a sub1G packet-oriented client signal at a source node, wherein the sub1G packet-oriented client signal comprises a plurality of client packets and an inter-packet gap (IPG) between respective ones of the plurality of client packets;
forming a 64B/66B-encoded client signal by encoding respective individual client packets of the plurality of client packets into a set of 64B/66B-encoded client blocks and filling the IPG between respective ones of the plurality of client packets with a respective set of 64B/66B idle blocks;
generating a rate adapted 64B/66B-encoded client thread signal by inserting thread operations, administration and maintenance (ThOAM) overhead for the sub1G packet-oriented client signal into the 64B/66B-encoded client signal and performing an idle mapping procedure (IMP) to modify a number of 64B/66B idle blocks in one or more of the sets of 64B/66B idle blocks of the 64B/66B-encoded client signal;

generating a Metro Transport Network (MTN) path signal by defining a plurality of pseudo-Ethernet packets in an MTN path, defining a thread channel within the plurality of pseudo-Ethernet packets for carrying the sub1G packet-oriented client, and mapping the rate adapted 64B/66B-encoded client thread signal into the defined thread channel;
transmitting the MTN path signal over the MTN path;
receiving the MTN path signal at an ingress of a sub1G-aware intermediate node;
extracting the rate adapted 64B/66B-encoded client thread signal from the plurality of pseudo-Ethernet packets;
generating a modified rate adapted 64B/66B-encoded client thread signal by modifying a number of 64B/66B idle blocks in one or more sets of the 64B/66B idle blocks of the extracted rate adapted 64B/66B-encoded client thread signal to match an egress thread channel rate of the sub1G-aware intermediate node;
generating an egress MTN path signal by defining an egress thread channel within the plurality pseudo-Ethernet packet for carrying the sub1G packet-oriented client signal and mapping the modified rate adapted 64B/66B-encoded client thread signal into the defined egress channel within the plurality of pseudo-Ethernet packets;
transmitting the egress MTN path signal to a sink node;
receiving the egress MTN path signal at the sink node;
locating the plurality of pseudo-Ethernet packets in the egress MTN path signal;
extracting a plurality of sets of 64B/66B-encoded client blocks, a plurality of sets of 64B/66B idle blocks and the ThOAM overhead from the modified rate adapted 64B/66B-encoded client signal of the egress MTN path signal; and
decoding respective sets of the extracted plurality of sets of 64B/66B-encoded client blocks to recover the sub1G packet-oriented client signal.

14. A source node for transmitting a sub1G packet-oriented client signal over a Metro Transport Network (MTN), the source node comprising circuitry to:
receive a sub1G packet-oriented client signal at a source node, wherein the sub1G packet-oriented client signal comprises a plurality of client packets and an inter-packet gap (IPG) between respective ones of the plurality of client packets;
form a 64B/66B-encoded client signal by an encoder, the encoder to encode individual client packets of the plurality of client packets into a set of 64B/66B-encoded client blocks and fill the IPG between respective ones of the plurality of client packets with a respective set of 64B/66B idle blocks;
generate a rate adapted 64B/66B-encoded client thread signal by a thread operation, administration and maintenance (ThOAM) circuit and an idle mapping procedure (IMP) circuit, the ThOAM circuit to insert ThOAM overhead for the sub1G packet-oriented client signal into the 64B/66B-encoded client signal and the IMP circuit to modify a number of 64B/66B idle blocks in one or more sets of 64B/66B idle blocks of the 64B/66B-encoded client thread signal; and
generate an MTN path signal by a pseudo-Ethernet Packet maker, the pseudo-Ethernet Packet maker to:
define a plurality of pseudo-Ethernet packets in an MTN path, define a thread channel within the plurality of pseudo-Ethernet packets for carrying the sub1G packet-oriented client, and map the rate adapted 64B/66B-encoded client thread signal into the defined thread channel.

15. The source node of claim 14, wherein the ThOAM circuit to insert the ThOAM overhead for the sub1G packet-oriented client signal into the 64B/66B-encoded client signal as a MTN ordered set (OS).

16. The source node of claim 14, wherein a plurality of sub1G packet-oriented client signals are received at the source node and wherein:

the circuitry to generate the rate adapted 64B/66B-encoded client thread signal generates a respective rate adapted 64B/66B-encoded client thread signal for respective ones of the plurality of sub1G packet-oriented client signals; and the circuitry to generate the MTN path signal defines a respective thread channel within the plurality of pseudo-Ethernet packets for carrying respective ones of the plurality of sub1G packet-oriented clients and maps the respective rate-adapted 64B/66B-encoded client thread signals into the respective defined thread channel within the plurality of pseudo-Ethernet packets.

17. The source node of claim 14, wherein the sub1G packet-oriented client signal is a 1000 Mbit/s (1000BASE-x/G) stream employing 8B/10B code blocks, the circuitry further to transcode the 8B/10B code blocks into 64B/66B code blocks to at least partially form the 64B/66B-encoded client signal.

18. The source node of claim 14, wherein the plurality of pseudo-Ethernet packets in the MTN path respectively comprise a plurality of data bytes forming a payload area and wherein the pseudo-Ethernet Packet maker to:

segment the payload area into a plurality of thread channel members;

assign one or more of the plurality of thread channel members to the defined thread channel for carrying the sub1G packet-oriented client; and map the rate adapted 64B/66B-encoded client thread signal into the one or more of the plurality of thread channel members assigned to the defined thread channel.

19. The source node of claim 14, wherein the pseudo-Ethernet Packet maker to map the rate adapted 64B/66B-encoded client thread signal into the defined thread channel within the plurality of pseudo-Ethernet packets by mapping the rate adapted 64B/66B-encoded client thread signal from a single client into the plurality of thread channel members assigned to the defined thread channel within the plurality of pseudo-Ethernet packets.

20. The source node of claim 16, wherein the plurality of pseudo-Ethernet packets in the MTN path respectively comprise a plurality of data bytes forming a payload area and wherein the pseudo-Ethernet Packet maker to:

segment the payload area into a plurality of thread channel members;

assign one or more of the plurality of thread channel members to the respective defined thread channel for carrying the sub1G packet-oriented client; and map the respective rate adapted 64B/66B-encoded client thread signal into the one or more of the plurality of thread channel members assigned to the respective defined thread channel within the plurality of pseudo-Ethernet packets.

21. The source node of claim 14, comprising circuitry to transmit the MTN path signal over the MTN path to a sub1G-aware intermediate node.

\* \* \* \* \*